United States Patent
Park et al.

(10) Patent No.: US 12,380,824 B2
(45) Date of Patent: *Aug. 5, 2025

(54) DISPLAY DRIVING CIRCUIT AND OPERATING METHOD FOR PERFORMING ENCODING AND DECODING

(71) Applicant: SAMSUNG ELECTRONICS CO., LTD., Suwon-si (KR)

(72) Inventors: Jinyong Park, Suwon-si (KR); Hongki Kwon, Seongnam-si (KR); Taewoo Kim, Hwaseong-si (KR); Yonghoon Yu, Suwon-si (KR); Hyunwook Lim, Seoul (KR); Byeongcheol Jang, Seoul (KR); Woohyuk Jang, Hwaseong-si (KR); Hojun Chung, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 66 days.

This patent is subject to a terminal disclaimer.

(21) Appl. No.: 18/233,614

(22) Filed: Aug. 14, 2023

(65) Prior Publication Data

US 2023/0388522 A1    Nov. 30, 2023

Related U.S. Application Data

(63) Continuation of application No. 17/412,965, filed on Aug. 26, 2021, now Pat. No. 11,769,434.

(30) Foreign Application Priority Data

Dec. 11, 2020    (KR) .................. 10-2020-0173579

(51) Int. Cl.
*H04N 19/174*    (2014.01)
*G06T 1/20*    (2006.01)
(Continued)

(52) U.S. Cl.
CPC .............. *G09G 3/20* (2013.01); *G06T 1/20* (2013.01); *G06T 1/60* (2013.01); *G06T 9/00* (2013.01);
(Continued)

(58) Field of Classification Search
CPC ... G09G 2310/0275; G09G 2310/0291; G09G 2310/04; G09G 2330/021; G09G 2340/02;
(Continued)

(56) References Cited

U.S. PATENT DOCUMENTS 6,930,675 B2    8/2005 Ishiyama
8,965,140 B1    2/2015 Xu et al.
(Continued)

FOREIGN PATENT DOCUMENTS

JP    2010-515397 A    5/2010
JP    2016-530731 A    9/2016
(Continued)

OTHER PUBLICATIONS

Notice of Allowance issued Sep. 30, 2024 by the Korean Patent Office for KR Patent Application No. 10-2020-0173579.

*Primary Examiner* — Behrooz M Senfi
(74) *Attorney, Agent, or Firm* — Sughrue Mion, PLLC

(57) ABSTRACT

A display driver circuit receives externally-encoded image data and processes the data using a memory (graphic RAM), an internal encoder, and an external decoder configured to operate on the externally-encoded image data. The processed data is provided to a display device by a source driver of the display driver circuit. Data is processed through the graphic RAM and an internal decoder or the external decoder depending on whether a slice of the data is a currently received update slice, a recently received standby slice, or a still slice.

20 Claims, 14 Drawing Sheets

(51) Int. Cl.
  *G06T 1/60* (2006.01)
  *G06T 9/00* (2006.01)
  *G09G 3/20* (2006.01)
  *G09G 5/00* (2006.01)

(52) U.S. Cl.
  CPC ........... *G09G 5/006* (2013.01); *H04N 19/174* (2014.11); *G09G 2310/0275* (2013.01); *G09G 2310/0291* (2013.01); *G09G 2310/04* (2013.01); *G09G 2330/021* (2013.01); *G09G 2340/02* (2013.01); *G09G 2360/127* (2013.01)

(58) Field of Classification Search
  CPC ......... G09G 2360/127; G09G 2370/08; G09G 3/20; G09G 5/006; G06T 1/20; G06T 1/60; G06T 9/00; H04N 19/174
  USPC .................................................. 375/240.12
  See application file for complete search history.

(56) References Cited

U.S. PATENT DOCUMENTS

| | | | |
|---|---|---|---|
| 9,041,720 B2 | 5/2015 | Sadowski et al. | |
| 9,257,100 B2 | 2/2016 | Han et al. | |
| 9,514,511 B2 | 12/2016 | Lee et al. | |
| 9,613,554 B2* | 4/2017 | Jang | G09G 3/20 |
| 9,723,317 B2 | 8/2017 | Hattori | |
| 9,743,116 B2 | 8/2017 | Kim et al. | |
| 10,366,669 B2* | 7/2019 | Bae | G09G 5/395 |
| 10,565,963 B2* | 2/2020 | Kim | G09G 5/18 |
| 10,834,411 B2* | 11/2020 | Kim | H04N 19/428 |
| 10,885,859 B2 | 1/2021 | Mitsuzawa | |
| 11,769,434 B2* | 9/2023 | Park | G09G 5/006 |
| | | | 345/501 |
| 2008/0112489 A1 | 5/2008 | Malladi et al. | |
| 2008/0159387 A1 | 7/2008 | Dvir et al. | |
| 2014/0362098 A1 | 12/2014 | Kerofsky | |
| 2017/0076700 A1 | 3/2017 | Yoo et al. | |
| 2017/0287384 A1 | 10/2017 | Lee et al. | |

FOREIGN PATENT DOCUMENTS

| | | |
|---|---|---|
| JP | 2019-191522 A | 10/2019 |
| JP | 6622879 B2 | 12/2019 |
| KR | 2002-0068951 A | 8/2002 |
| KR | 10-0443324 B1 | 8/2004 |
| KR | 10-2017-0031324 A | 3/2017 |
| KR | 10-1771169 B1 | 8/2017 |
| KR | 10-2017-0105213 A | 9/2017 |
| KR | 10-2017-0113011 A | 10/2017 |

* cited by examiner

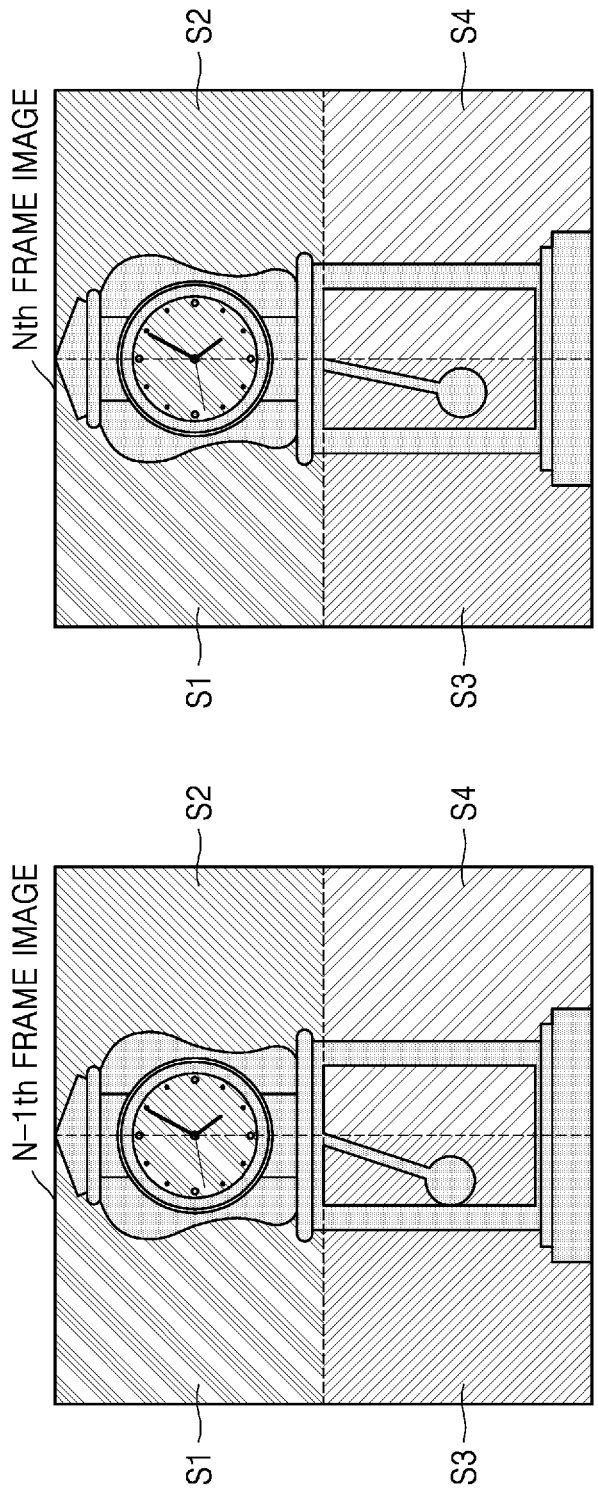

DISPLAY DRIVING CIRCUIT AND OPERATING METHOD FOR PERFORMING ENCODING AND DECODING

CROSS-REFERENCE TO RELATED APPLICATIONS

This application is a Continuation of U.S. application Ser. No. 17/412,965 filed Aug. 26, 2021, and claims priority under 35 U.S.C. § 119 to Korean Patent Application No. 10-2020-0173579, filed on Dec. 11, 2020, in the Korean Intellectual Property Office; the disclosures of the above applications are incorporated by reference herein.

BACKGROUND

The present disclosure relates to a display driving circuit, and more particularly, to a display driving circuit that performs encoding and decoding to reduce power consumption, and an operating method thereof.

A display device includes a display panel that displays an image and a display driving circuit that drives the display panel. The display driving circuit may drive the display panel by receiving image data from a processor and applying an image signal corresponding to the received image data to a data line of the display panel. The display device may be implemented in various forms such as a Liquid Crystal Display (LCD), a Light Emitting Diode (LED) display, an Organic LED (OLED) display, and an Active Matrix OLED (AMOLED) display.

As information technology (IT) advances, the use of small electronic devices is increasing. Small electronic devices include a smart phone, a tablet PC, a portable multimedia player (PMP), a laptop personal computer, a wearable device, and the like. Because most small electronic devices operate based on power from a battery, it is important to reduce power consumption. Therefore, it is also important to reduce power consumption of a display device included in a small electronic device.

SUMMARY

An aspect of the technical idea of the present disclosure relates to encoding and decoding to reduce power consumption, and provides a controller for driving a display panel even if only some slices are updated, and a display driving circuit including the same.

According to an aspect of example embodiment, there is provided a method of operating a display driving circuit, the method including: receiving an update slice; writing the update slice to at least a portion of a graphic memory; identifying a type of each slice of a plurality of slices stored in the graphic memory; decoding the update slice and a standby slice by using a first decoder to obtain first decoded data; image-processing the first decoded data; decoding at least one still slice among the plurality of slices stored in the graphic memory by using a second decoder to obtain second decoded data; and integrating the second decoded data and the image-processed data.

According to an aspect of an example embodiment, there is provided a display driving circuit including: a graphic memory configured to store slices; a first decoder configured to decode an update slice and a standby slice; a second decoder configured to decode a still slice; an image-processing pipeline configured to perform image-processing; a second encoder configured to generate the still slice; and a controller, wherein the controller is configured to: control receiving the update slice, write the update slice to at least a portion of the graphic memory, identify a type each slice of a plurality of slices stored in the graphic memory, control a decoding the update slice and the standby slice by using the first decoder to obtain first decoded data, image-process the first decoded data, decode at least one still slice among the plurality of slices stored in the graphic memory by using the second decoder to obtain second decoded data, and integrate the second decoded data with the image-processed data to obtain integrated data.

According to an aspect of an example embodiment, there is provided an electronic device including: a processor configured to encode at least one slice including pixels changed between a previous frame and a current frame by using a first encoder, and transmit the at least one slice encoded based on the first encoder as an update slice to a display driving circuit; the display driving circuit configured to: receive the update slice, write the update slice to at least a portion of a graphic memory, identify a type of slices stored in the graphic memory, decode the update slice and a standby slice by using a first decoder to obtain first decoded data, image-process the first decoded data, decode a still slice among slices stored in the graphic memory using a second decoder to obtain second decoded data, and integrate data decoded based on the second decoder with the image-processed data to transmit an image signal to a display panel; and the display panel configured to receive the image signal and displaying an image based on the image signal.

BRIEF DESCRIPTION OF THE DRAWINGS

Embodiments will be more clearly understood from the following detailed description taken in conjunction with the accompanying drawings in which:

FIG. 5 is an example for explaining an image frame and a slice;

DETAILED DESCRIPTION OF THE EMBODIMENTS

Hereinafter, various embodiments of the present disclosure will be described in connection with the accompanying drawings.

Figure 1:
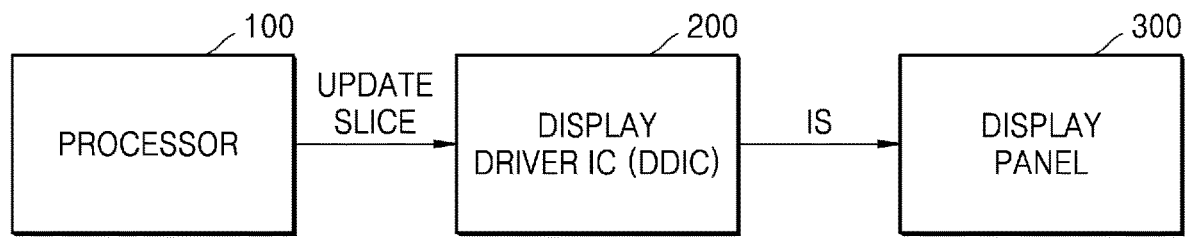
FIG. 1 is a block diagram illustrating an electronic device according to an example embodiment of the present disclosure.

FIG. 1 is a block diagram illustrating an electronic device 10 according to an example embodiment of the present disclosure.

As shown in FIG. 1, the electronic device 10 may include a processor 100, a display driving circuit 200, and a display panel 300.

According to various embodiments, the electronic device 10 may include devices having an image display function. For example, the electronic device 10 may include a smartphone, a tablet personal computer (PC), a portable multimedia player (PMP), a camera, a wearable device, Internet of things, a television, a digital video disk (DVD) player, a refrigerator, an air conditioner, an air purifier, a set-top box, a robot, a drone, various medical devices, a navigation device, a global positioning system (GPS) receiver, an Advanced Drivers Assistance System (ADAS), a vehicle device, furniture, or various measuring devices.

The processor 100 may generally control the electronic device 10. The processor 100 may generate image data to be displayed on the display panel 300 and transmit the image data to the display driving circuit 200.

In an embodiment, the processor 100 may transmit partial frame data DATA_PF to the display driving circuit 200. The processor 100 may not always transmit all frame data by calculating a difference between the previous frame and the current frame. For example, when the current frame changes at least a partial area from a previous frame, the processor 100 may transmit partial frame data DATA_PF including the at least partial area to the display driving circuit 200. As another example, when the current frame is entirely different from the previous frame (e.g., screen switching), the processor 100 may transmit the entire frame data DATA_FF to the display driving circuit 200. The partial frame data DATA_PF may be transmitted in a slice unit. A detailed description of the slice and partial frame will be described later with reference to FIG. 5.

In one embodiment, the processor 100 may correspond to an application processor. However, embodiments are not limited thereto, and the processor 100 may be implemented with various types of processors such as a central processing unit (CPU), a micro processing unit, a multimedia processor, and a graphics processing unit. For example, the processor 100 may be implemented as an integrated circuit (IC), and may be implemented as a mobile application processor (AP) or a system on chip (SoC).

The display driving circuit 200 may receive image data from the processor 100, converts the image data to an image signal IS for driving the display panel 300, and converts the converted image signal IS to the display panel 300.

In an embodiment, the display driving circuit 200 may selectively change an image-processing path according to frame data received from the processor 100. For example, when the partial frame data DATA_PF is received, the display driving circuit 200 may generate a control signal corresponding to the reception of partial frame data, and control the partial frame data DATA_PF to be image-processed and frame data other than the partial frame data DATA_PF among all frames to be simply decoded. A detailed description of the selective change of the image-processing path will be described later.

The display panel 300 is a display unit on which an actual image is displayed, and may be one of display devices that receive an electrically transmitted image signal IS and display a two-dimensional image, such as a thin film transistor-liquid crystal display (TFT-LCD), an organic light emitting diode (OLED) display, a field emission display, a plasma display panel (PDP), and the like. The display panel 300 may be implemented as another type of flat panel display or a flexible display panel.

Figure 2:
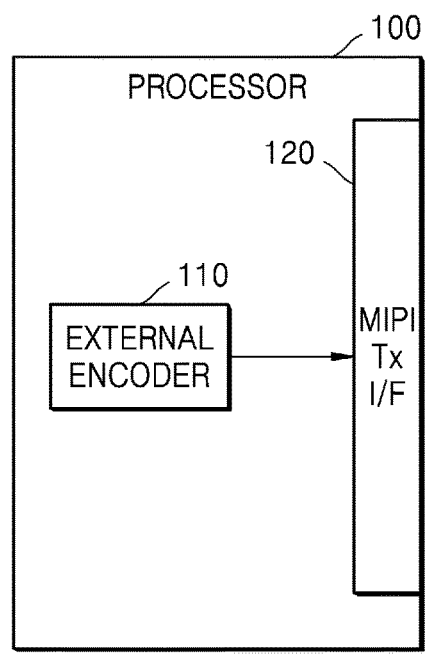
FIG. 2 is a block diagram showing a processor according to an example embodiment of the present disclosure.

FIG. 2 is a block diagram showing a processor according to an example embodiment of the present disclosure.

Referring to FIG. 2, the processor 100 may include an external encoder 110 and a transmission/reception interface circuit 120.

The external encoder 110 may perform encoding on image data. According to an embodiment, the external encoder 110 may generate the entire frame data DATA_FF by performing encoding on the entire frame image. In addition, the external encoder 110 may generate partial frame data DATA_PF by performing encoding on at least a partial area of the entire frame image. The external encoder 110 may be implemented as a display stream compression (DSC) encoder, but is not limited thereto.

In an embodiment, the external encoder 110 may perform encoding in a slice unit. For example, assuming that the entire frame consists of 4 slices, the external encoder 110 may encode image data for an area including at least one of the four slices.

The transmission/reception interface circuit 120 may transmit full frame data DATA_FF and partial frame data DATA_PF to the display driving circuit 200 through a channel. In an example embodiment, the transmission/reception interface circuit 120 may support an RGB interface, a CPU interface, a serial interface, a Mobile Display Digital Interface (MDDI), and an Inter Integrated Circuit (I2C) interface, a Serial Peripheral Interface (SPI), a Micro Controller Unit (MCU) interface, a Mobile Industry Processor Interface (MIPI), an embedded Display Port (eDP) interface, a D-subminiature (D-sub) interface, an optical interface, a High Definition Multimedia Interface (HDMI), and the like. In addition, in an example embodiment, the interface circuit (IFC) may support a Mobile High-definition Link (MHL) interface, a Secure Digital (SD) card/Multi-Media Card (MMC) interface, or an Infrared Data Association (IrDA) standard interface.

Figure 3:
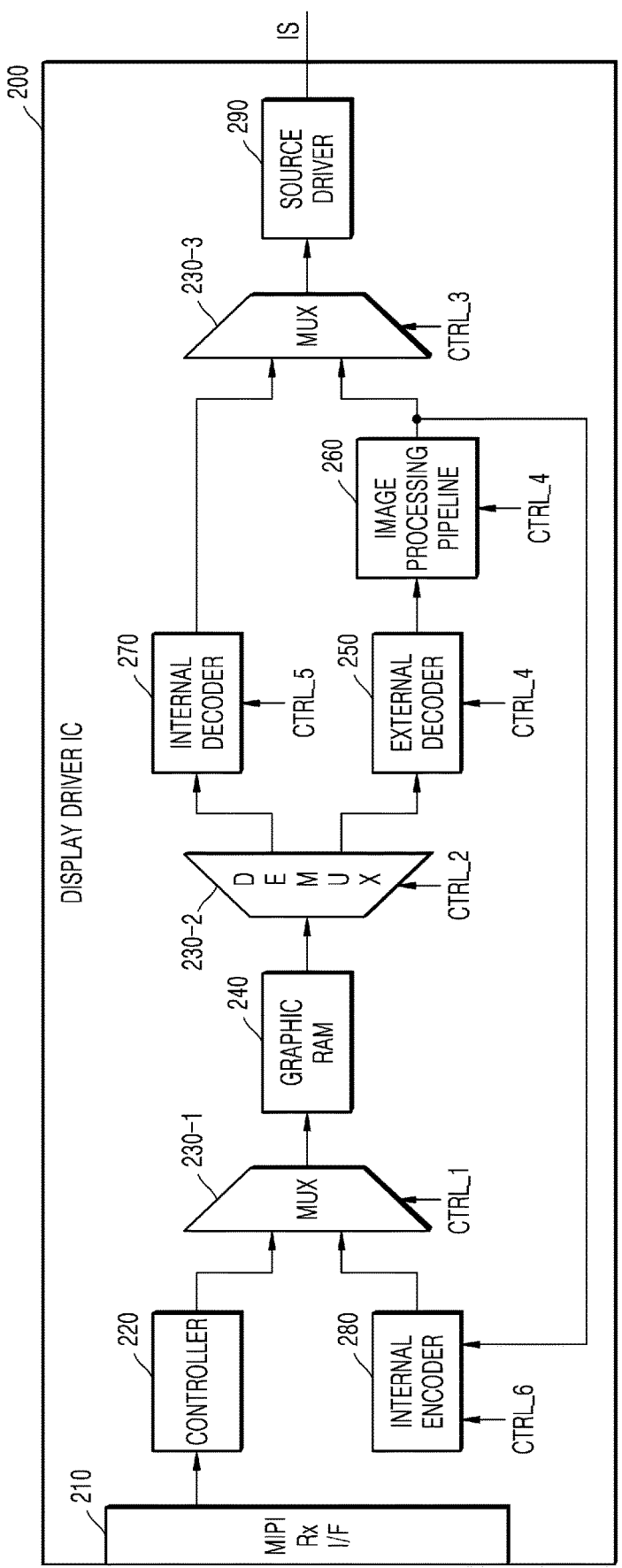
FIG. 3 is a block diagram showing a display driving circuit according to an example embodiment of the present disclosure.

FIG. 3 is a block diagram showing a display driving circuit according to an example embodiment of the present disclosure.

Referring to FIG. 3, a display driving circuit 200 includes a transmission/reception interface circuit 210, a controller 220, a first MUX 230-1, a DEMUX 230-2, a second MUX 230-3, a GRAM 240, an external decoder 250, an image-processing pipeline 260, an internal decoder 270, an internal encoder 280, and a source driver 290.

The transmission/reception interface circuit 210 may correspond to the transmission/reception interface circuit 120 included in the processor 100 of FIG. 2. The transmission/reception interface circuit 210 may receive full frame data DATA_FF or partial frame data DATA_PF and transmit the full frame data DATA_FF or partial frame data DATA_PF to other components of the display driving circuit 200.

The controller 220 may generate a control signal based on the received frame data. The control signal may correspond to a signal for selecting an input/output signal of the first MUX 230-1, the DEMUX 230-2, and the second MUX 230-3 of the display driving circuit 200. In addition, the control signal may determine an image-processing path through which the received frame data is processed by controlling turning the external decoder 250, the internal encoder 280, and the internal decoder 270 on/off A detailed description of the controller 220 will be described later with reference to FIG. 4.

The first MUX 230-1, the DEMUX 230-2, and the second MUX 230-3 may select an input signal or an output signal based on a control signal. For example, the first MUX 230-1 may output either frame data received from the controller 220 or encoded data from the internal encoder 280 to GRAM 240 based on a control signal. For example, the DEMUX 230-2 may output slice data received from the GRAM 240 to either the internal decoder 270 or the external decoder 250 based on the control signal. The second MUX 230-3 selectively may receive one of slice data decompressed through the internal decoder 270 and frame data image-processed through the image-processing pipeline 260 and output the selected one to the source driver 290.

The GRAM 240 may store image data in a frame unit. The GRAM 240 may store image data in a compressed form in a DSC format. The GRAM 240 may be divided into a plurality of storage areas, and each of the storage areas is mapped to each other to correspond to an area of an image frame. For example, the first storage area of the plurality of storage areas of the GRAM 240 may store data obtained by compressing an image of the first area of the image frame in a DSC format. Data stored in each of the plurality of storage areas may be referred to as slice data, respectively.

The external decoder 250 and the internal decoder 270 may decode slice data stored in the GRAM 240. According to an embodiment, the external decoder 250 may decode slice data encoded by the external encoder 110 included in the processor 100 of FIG. 2. That is, the external decoder 250 may not decode slice data encoded by the internal encoder 280. The decoding method of the external decoder 250 may correspond to the encoding method of the external encoder 110. According to another embodiment, the internal decoder 270 may decode only slice data encoded by the internal encoder 280. The decoding method of the internal decoder 270 may correspond to the encoding method of the internal encoder 280.

In the above-described embodiments, the external standard of the external decoder 250 and the internal standard of the internal decoder 270 may be the display driving circuit 200. That is, because the external encoder 110 performs encoding in the processor 100 that is outside the display driving circuit 200, it is referred to as the external encoder 110, but is not limited thereto. The external encoder 110 may be defined in various terms such as a first encoder and a standard encoder. The internal encoder 280 is referred to as the internal encoder 280 because encoding is performed inside the display driving circuit 200, but is not limited thereto. The internal encoder 280 may be referred in various terms such as a second encoder and a partial encoder.

The image-processing pipeline 260 may include a plurality of image-processing modules. The plurality of image-processing modules may include instructions for image-processing necessary to display image data received from the processor 100 on the display panel 300. For example, the plurality of image-processing modules may include modules for various image-processing, such as a vertex shader module, a geometric shader module, a pixel shader module, a rasterizer module, a blending module, a tessellation, an interpolation module, and the like.

The source driver 290 may generate a driving signal for driving the display panel 300 and apply the generated driving signal to the display panel 300 based on the image signal processed from the internal decoder 270 and/or the image-processing pipeline 260.

Figure 4:
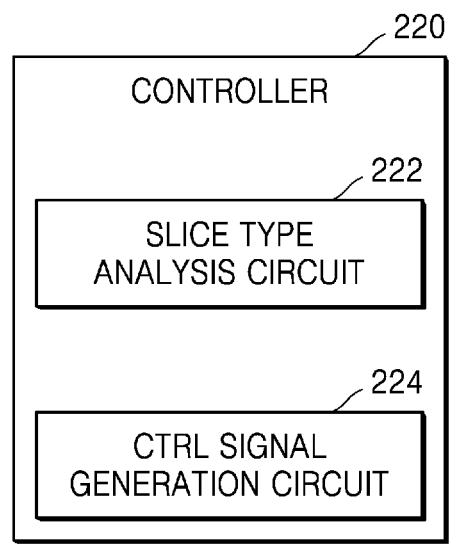
FIG. 4 is a block diagram showing a controller of a display driving circuit according to an example embodiment of the present disclosure.

FIG. 4 is a block diagram showing a controller of a display driving circuit according to an example embodiment of the present disclosure.

Referring to FIG. 4, the controller 220 of the display driving circuit 200 may include a slice type analysis circuit 222 and a control signal generation circuit 224.

The slice type analysis circuit 222 may determine the type of slice stored in the GRAM 240. The slice type analysis circuit 222 may determine slices stored in the GRAM 240 as one of an update slice, a standby slice, and a still slice. The update slice may refer to a slice received from the processor 100 in the current frame. The standby slice is not updated in the current frame, but may refer to a slice received from the processor 100 in a previous frame. The still slice may refer to a slice that has not been updated in at least two frames.

The control signal generation circuit 224 may generate control signals for changing an image-processing path according to the analyzed slice type. For example, if an update slice is received, the control signal generation circuit 224 may generate signals that control the received update slice to be decoded through the external decoder 250 and image-processed through the image-processing pipeline 260.

As another example, when the slice stored in the GRAM 240 is a standby slice, in the same way as the update slice, image-processing may be performed using the image-processing pipeline 260 and a control signal may be generated to internally encode the image-processed pixel data.

As another example, when a slice in the GRAM 240 is a still slice, signals for controlling decoding through the internal decoder 270 may be generated. That is, because the still slice is a slice encoded through the internal encoder 280, while decoding through the internal decoder 270 is performed, power consumption may be reduced by controlling the external decoder 250 and the image-processing pipeline 260 to be deactivated.

TABLE 1

|  | CTRL 1 | CTRL 2 | CTRL 3 | CTRL 4 | CTRL 5 | CTRL 6 |
| --- | --- | --- | --- | --- | --- | --- |
| First mode | 0 | 1 | 1 | 1 | 0 | 0 |
| Second mode | 1 | 1 | 1 | 1 | 0 | 1 |
| Third mode | X | 0 | 0 | 0 | 1 | 0 |

Referring to Table 1, the first mode may correspond to an operation mode for processing the update slice when the display driving circuit 200 receives an update slice. The control signal generation circuit 224 may apply a "0" control signal CTLR_1 to the first MUX 230-1. The first MUX 230-1 may receive an update slice from the controller 220 and transmit the received update slice to the GRAM 240. Thereafter, the GRAM 240 may write the update slice to a mapped area among the storage areas of the GRAM 240. The second MUX 230-3 may output an update slice to the external decoder 250 according to the control signal CTRL_2 of "1". Thereafter, the update slice may be decoded or decompressed through the external decoder 250 activated according to the control signal CTRL_4 of "1", and image-processed through the image-processing pipeline 260. Thereafter, the second MUX 230-3 may output pixel data output from the image-processing pipeline 260 to the source driver 290 based on the control signal CTRL_3 of "1".

The second mode may correspond to an operation mode in which the display driving circuit 200 processes a standby slice. The standby slice is a slice newly received in the previous frame and not updated in the current frame. However, the standby slice may correspond to a slice in which internal encoding has not been performed. When there is no slice update in the next frame by performing internal encoding on the standby slice, the controller 220 may not go through the image-processing pipeline 260, and acquire pixel data that may be processed by the source driver 290 only by internal decoding. The controller 220 may transmit the standby slice to the external decoder 250 and the image-processing pipeline 260 by applying the control signal CTRL_2 of "1" to the DEMUX 230-2. Thereafter, the second MUX 230-3 may transmit the output pixel data to the source driver 290 based on the control signal CTRL_3 of "1".

Meanwhile, the controller 220 may activate the internal encoder 280 by applying a control signal CTRL_6 of "1" to the internal encoder 280. The activated internal encoder 280 may perform internal encoding on the output pixel data. The controller 220 may write the internally encoded standby slice to the GRAM 240 by applying the control signal CTRLI_1 of "1" to the first MUX 230-1.

The third mode may correspond to when the display driving circuit 200 operates in a low power mode. The display driving circuit 200 may also be referred to as a DDIC. The low power mode may refer to an operation mode when an update slice is not received during at least two or more frame sections. In addition, the low power mode may refer to an operation mode in which all slices stored in the GRAM 240 are internally encoded slices. The controller 220 may transmit a still slice from the GRAM 240 to the internal decoder 270 by applying a control signal CTRL_2 of "0" to the DEMUX 230-2. Because the still slice is already internally encoded data through the internal encoder 280, it must be decoded through the internal decoder 270. Accordingly, the controller 220 may activate the internal decoder 270 by applying a control signal CTRL_5 of "1" to the internal decoder 270. Thereafter, the second MUX 230-3 may transmit the decoded (or decompressed) pixel data to the source driver 290 through the internal decoder 270 according to the control signal CTRL_3 of "0".

FIG. 5 is an example for explaining partial frame data and a slice.

Referring to FIG. 5, the image frame may be divided into a first slice S1 to a fourth slice S4. For example, referring to FIG. 5, when the image frame is divided into four, the first slice S1 may include pixel information of an upper left area.

In various embodiments, at least one slice may be changed in relation to the (n−1)-th frame and the n-th frame that is the next frame. For example, assuming that a video in which a pendulum swings is played, pixel changes in the (n−1)-th frame and the n-th frame may occur only in the third slice S3. A slice including the changed pixel value may be referred to as an update slice. That is, the processor 100 may transmit to the display driving circuit 200 an update slice (e.g., the third slice S3) including the pixel values changed in successive frames, and may not repeatedly perform image-processing on the remaining slices, thereby reducing power consumption. Slices other than the update slice among the plurality of slices may be referred to as still slices.

In the above-described embodiment, the description has been made on the basis of dividing the image frame into four slices, but embodiments are not limited thereto. The number of slices constituting the image frame may be changed. For example, as the number of slices constituting an image frame increases, the size of an area corresponding to one slice decreases, and thus, the size of the update slice transmitted to the display driving circuit 200 may decrease.

According to an embodiment, the image frame may be divided into a plurality of slices having the same size. Each slice may have a predetermined width W and height H. For example, an image frame having a resolution of 1440*2560 may be divided into slices having a resolution of 360*160. In this case, the width W of the slice is defined as 360 and the height H is defined as 160.

Figure 6A:
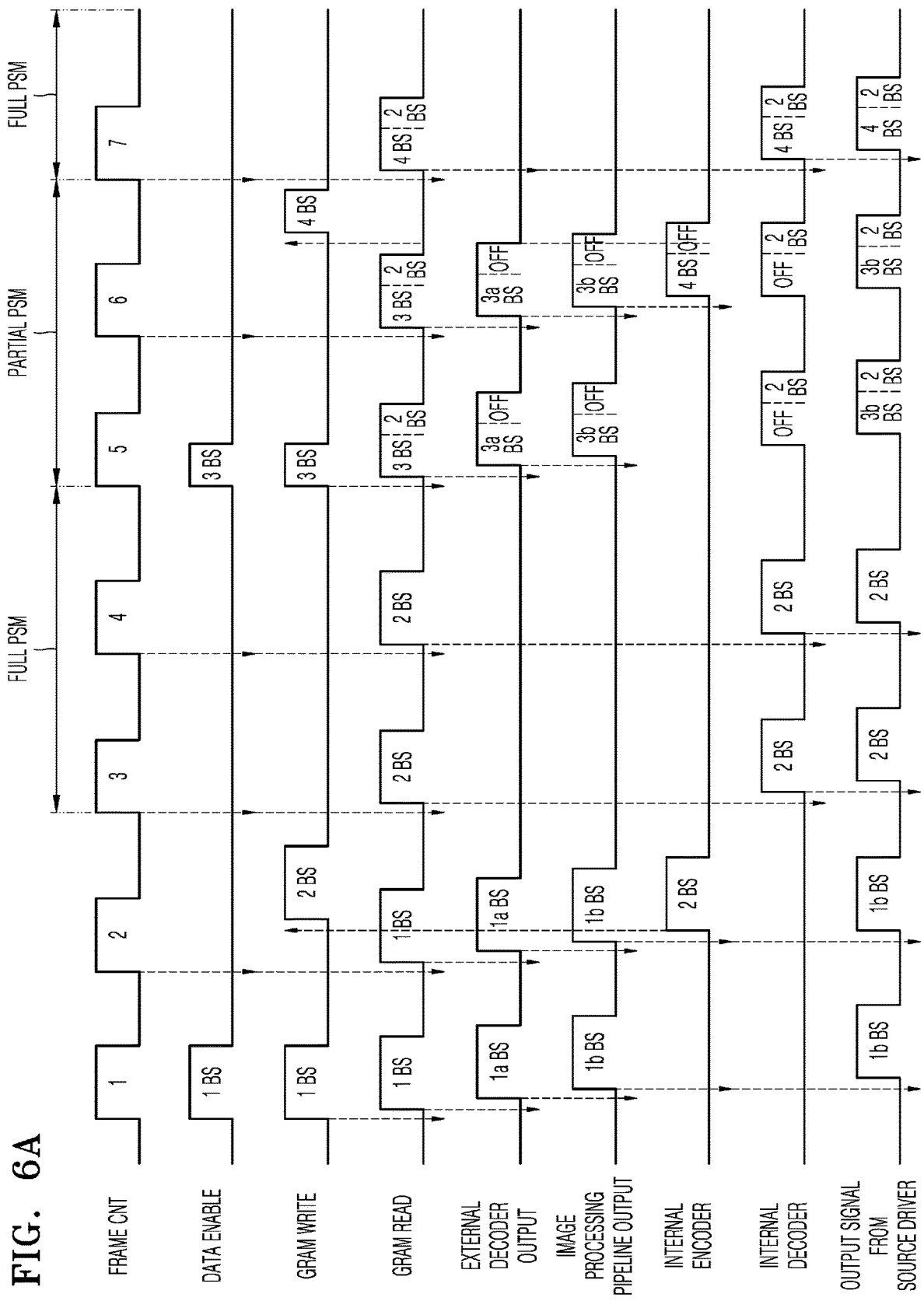
FIG. 6A is a diagram illustrating an operation timing of a display driving circuit according to an example embodiment of the present disclosure.

FIG. 6A is a diagram illustrating an operation timing of a display driving circuit according to an example embodiment of the present disclosure. At the top of FIG. 6A, a signal, FRAME CNT, is shown, which has a rising edge at the beginning of each of example frames 1, 2, 3, 4, 5, 6 and 7; each frame may be referred to as a "frame section" below.

Referring to FIG. 6A, during a first frame section, the display driving circuit 200 may receive a first update slice. The reception of the first update slice is indicated by assertion of the DATA ENABLE waveform of FIG. 6A. The first update slice received in the first frame section may have a first bit stream 1 BS. According to an embodiment, the first update slice may include all of a plurality of slices. For example, if the screen is switched during video playback and the entire screen displayed is changed, the first update slice may include all of a plurality of slices included in an image frame.

The controller 220 may write the received first update slice to the GRAM 240. The controller 220 may sequentially write the first update slice to the GRAM 240. For example, among the plurality of slices, a first slice S1 may be written to a first area, and a second slice S2 may be written to a second area. In this case, because the first update slice includes all of the slices constituting the image frame, all storage areas of the GRAM 240 may be newly written.

The external decoder 250 may read the first update slice from the GRAM 240 and perform decoding. The decoding method may correspond to the encoding method of the external encoder 110. For example, the encoding and decoding methods may be based on the DSC method. According to an embodiment, the external decoder 250 may request a read from the GRAM 240 in a slice unit. Referring to FIG. 5 also, the external decoder 250 may sequentially request the GRAM 240 to read the first slice S1 to the fourth slice S4. The external decoder 250 may output the first pixel data 1a BS by decoding the first update slice. The first pixel data 1a BS may correspond to pixel data of an image frame before being encoded by the external encoder 110. The image-processing pipeline 260 may receive the first pixel data 1a BS and perform image-processing. The image-processing pipeline 260 may output the second pixel data 1b BS to the source driver 290. The second pixel data 1b BS may refer to image-processed pixel data in a format that may be output to the display panel 300. The source driver 290 may convert the second pixel data 1b BS into an image signal IS and transmit the converted image signal IS to the display panel 300.

Generally, the pixel data input to the external decoder 250 is indicated with a letter "a." Also, the pixel data output by the external decoder 250 is indicated with a letter "b." Data output by the internal decoder 270 does not use an "a" or "b" when indicated. See, for example, FIG. 6A and the data 2 BS during frame section 3.

During the second to fourth frame sections, the update slice may not be received. That is, the second to fourth frame sections may be sections in which an image is in a still state or a still image is output. However, the operation of the display driving circuit 200 may be different in the second frame section and the third to fourth frame sections.

The controller 220 may identify that there is no newly received update slice at the current frame (second frame), and may perform internal encoding on a slice updated in the previous frame (first frame). That is, the controller 220 may determine to perform the internal encoding in a slice unit. When processing a slice, the controller 220 may determine an operation mode through the slice type analysis circuit 222 and the control signal generation circuit 224.

The controller 220 may obtain the second pixel data 1b BS in order to output the same still image as the first frame. The process of using the external decoder 250 and the image-processing pipeline 260 for obtaining the second pixel data 1b BS is the same as that described above in the first frame, and thus will be omitted.

The controller 220 may obtain a second bit stream 2 BS by activating the internal encoder 280. The second bit stream 2 BS may refer to a value obtained by internally encoding the second pixel data 1b BS. The encoding method of the internal encoder 280 may be different from the encoding method of the external encoder 110. The controller 220 may write the second bit stream 2 BS to the GRAM 240. The reason for this is that if the update slice is not received continuously, by internally encoding the image-processed second pixel data 1b BS through the image-processing pipeline 260 and storing the encoded image-processed second pixel data 1b BS in the GRAM 240, the second pixel data 1b BS, on which image-processing is completed, is immediately acquired by only decoding through the internal decoder 270.

During the third frame and the fourth frame section, the display driving circuit 200 may operate in a low power mode. The low power mode may refer to a mode in which power consumption is reduced by only decoding the internally encoded slice using the internal decoder 270 while deactivating the external decoder 250 and the image-processing pipeline 260

Specifically, the update slice may not be received by the rising edge of the third frame. Because the update slice has not been received in the current frame (the third frame), the controller 220 may check, in this example, whether an update slice has been received in the previous frame (the second frame). Because the update slice is not received even in the previous frame (the second frame), the controller 220 may determine that the internally encoded second pixel data 1b BS, that is, the second bit stream 2 BS, is stored in the GRAM 240.

The controller 220 may receive the second bit stream 2 BS from the GRAM 240 by activating the internal decoder 270. The internal decoder 270 may acquire second pixel data 1b BS by performing decoding on the second bit stream 2 BS. Because the second pixel data 1b BS obtained by decoding the second bit stream 2 BS is the same as pixel data previously image-processed through the external decoder 250 and the image-processing pipeline 260, the internal decoder 270 may output the second pixel data 1b BS to the source driver 290. That is, looking at the third frame section, it may be seen that the display driving circuit 200 only decodes the internally encoded second bit stream 2 BS while the external decoder 250 and the image-processing pipeline 260 in an inactive state to obtain the second pixel data 1b BS on which the image-processing has been completed. The display driving circuit 200 may operate in a low power mode based on deactivation of the external decoder 250 and the image-processing pipeline 260. Because the fourth frame section is a section operating in the low power mode like the third frame section, a description of the fourth frame will be omitted.

During the fifth frame section, the display driving circuit 200 may receive a second update slice. The DATA ENABLE waveform is asserted at the beginning of the fifth frame section (see FIG. 6A). The second update slice may have a third bit stream 3 BS. Unlike the first update slice which included all slices of an image in this example, the second update slice may include only some slices of a plurality of slices constituting an image frame. That is, when only a partial area of the image frame is changed, the second update slice may correspond to a slice including the changed area. For example, referring to FIG. 5 also, the n-th frame and the (n−1)-th frame may differ only in the area of the third slice S3. The processor 100 may transmit only the third slice S3 to the display driving circuit 200 as the second update slice.

The controller 220 may write the second update slice to the GRAM 240. Because the second update slice is a slice corresponding to a partial area of the image frame, the controller 220 may write the second update slice to a storage area mapped to a partial area of the image frame among storage areas of the GRAM 240. For example, the controller 220 may write the third slice S3 to a third area of the storage areas of the GRAM 240.

The GRAM 240 may store both the second bit stream 2 BS and the third bit stream 3 BS. That is, the first slice S1, the second slice S2, and the fourth slice S4 may include a second bit stream 2 BS fetched internally through the internal decoder 270, and the third slice S3 may include a third bit stream 3 BS. According to an embodiment, the GRAM 240 may output read data to the external decoder 250 and the internal decoder 270, respectively. The GRAM 240 may output a third bit stream 3 BS to the external decoder 250 and output a second bit stream 2 BS to the internal decoder 270 in a slice unit. This is because the second bit stream 2 BS is an internally encoded stream through the internal encoder 270, and the third bit stream 3 BS is an externally encoded stream through the external decoder 250.

The external decoder 250 may perform decoding on the third bit stream 3 BS of the third slice S3. Through the decoding, the external decoder 250 may output the first pixel data 3a BS of the third slice S3. Because the external decoder 250 received only the third bit stream 3 BS of the third slice S3 from the GRAM 240, the decoding of the remaining slices S1, S2, and S4 having the second bit stream 2 BS may not be performed. If, assuming that the time required to decode each slice is the same, it may be seen that the activation time of the external decoder 250 is reduced to ¼ compared to when all slices of the GRAM 240 are decoded. That is, the external decoder 250 may operate in the low power mode reduced by 75% compared to processing all slices of a frame.

The image-processing pipeline 260 may receive the first pixel data 3a BS of the third slice S3 and perform image-processing. The image-processing pipeline 260 may produce image-processed second pixel data 3b BS. The second pixel data 3b BS may correspond to result values obtained from image-processing of pixels of the third slice S3. The image-processing pipeline 260 may output the second pixel data 3b BS of the third slice S3 to the source driver 290.

The internal decoder 270 may operate in parallel with the external decoder 250 and the image-processing pipeline 260. The internal decoder 270 may receive the second bit stream 2 BS from the GRAM 240 and perform decoding on the second bit stream 2 BS. The second bit stream 2 BS may correspond to an internally encoded value by completing the image-processing of the pixels of the first slice S1, the second slice S2, and the fourth slice S4. In the fifth frame section, because the changed pixel value is included in the third slice S3, the remaining slices S1, S2, and S4 may be the same as outputting a still image. Accordingly, the internal decoder 270 decodes the second bit stream 2 BS to obtain the second pixel data 1b BS of the remaining slices S1, S2, and S4 and outputs the obtained second pixel data 1b BS to the source driver 290.

According to an embodiment, the source driver 290 may further include a buffer (not shown). Because the second pixel data fetched from the GRAM 240 (already previously operated on by external decoder 25) is processed by the internal decoder 270 more quickly than data such as 3 BS processed by the external decoder 250 and the image-processing pipeline 260, a buffer may be used to align these results in time. For example, the second pixel data 1b BS of the remaining slices S1, S2, and S4 are temporarily stored in a buffer (not shown) and the second pixel data 3b BS of the update slice S3 is then received. The source driver 290 may then associated the second pixel data 1b BS and 3b BS at the same time and output the result to the display panel 300.

In the above-described embodiment, it has been described that the internal decoder 270 may operate in parallel with the external decoder 250 and the image-processing pipeline 260, but is not limited thereto. According to various embodiments, the internal decoder 270 may be activated alternately with the external decoder 250 and the image-processing pipeline 260. For example, the GRAM 240 may sequentially output a plurality of slices according to a slice unit. Because the first slice S1 is a still image, the GRAM 240 may operate to output the first slice S1 to the internal decoder 270, and thereafter, because the second slice S2 is a still image, the GRAM 240 may operate to output the second slice S2 to the internal decoder 270, and thereafter, because the third slice S3 is an update slice, the GRAM 240 may operate to output the third slice S3 to the external decoder 250. When the GRAM 240 sequentially outputs a plurality of slices, the internal encoder 280 and the external encoder 110 are not activated at the same time, and activation/deactivation may be repeated by alternating with each other.

The update slice may not be received in the sixth frame section. The controller 220 may identify that there is no newly received update slice at the current frame (sixth frame), and may perform internal encoding on a slice updated in the previous frame (fifth frame). That is, the controller 220 may determine to perform the internal encoding in a slice unit. The controller 220 may identify a slice changed (or updated) in the previous frame (the fifth frame) through the slice type analysis circuit 222 as a standby slice, and identify the remaining slices as still slices. The second update slice may include only the third slice S3.

The controller 220 may acquire second pixel data 1b BS and 3b BS in order to output the same image as the fifth frame. The process of using the external decoder 250 and the image-processing pipeline 260 to obtain the second pixel data 3b BS for the standby slice S3 is the same as that described above in the fifth frame, and thus, descriptions thereof are omitted. In addition, because the process of obtaining the second pixel data 1b BS of the still slices S1, S2, and S4 excluding the standby slice by decoding the second bit stream 2 BS through the internal decoder 270 is the same as that described above in the fifth frame, descriptions thereof are omitted.

The controller 220 may obtain a fourth bit stream 4 BS by activating the internal encoder 280. The fourth bit stream 4 BS may refer to a value obtained by internally encoding the second pixel data 3b BS of the third slice S3 that is a standby slice. The encoding method of the internal encoder 280 may be different from the encoding method of the external encoder 110. The controller 220 may write the fourth bit stream 4 BS to the GRAM 240. The reason for this is that if the update slice is not received continuously, by internally encoding the second pixel data 3b BS of the third slice S3 on which image-processing is completed through the image-processing pipeline 260 and storing the internally encoded second pixel data 3b BS in the GRAM 240, the second pixel data 3b BS of the image-processed third slice S3 is immediately acquired by only decoding through the internal decoder 270.

Looking at the above-described fifth and sixth frames, because only the pixel data 3a BS of the update slice or still slice is image-processed through the external decoder 250 and the image-processing pipeline 260 and the pixel data of the still slices S1, S2, and S4 is processed without activating the external decoder 250 and the image-processing pipeline 260, a low power mode may be additionally maintained for some sections of the frame. Therefore, in the case of the fifth frame and the sixth frame, it may be understood that the display driving circuit 200 operates in a partial low power mode.

During the third frame and the fourth frame section, the display driving circuit 200 may operate in a low power mode. Because in the sixth frame section, the second pixel data 3b BS of the standby slice S3 is internally encoded to obtain the fourth bit stream 4 BS and stored in the GRAM 240, at the seventh frame time point, the GRAM 240 may store only internally encoded bit streams 2 BS and 4 BS. Accordingly, the controller 220 outputs the second bit stream 2 BS and the fourth bit stream 4 BS stored in the GRAM 240 to the internal decoder 270 to obtain the second pixel data 1b BS and 3b BS.

Figure 6B:
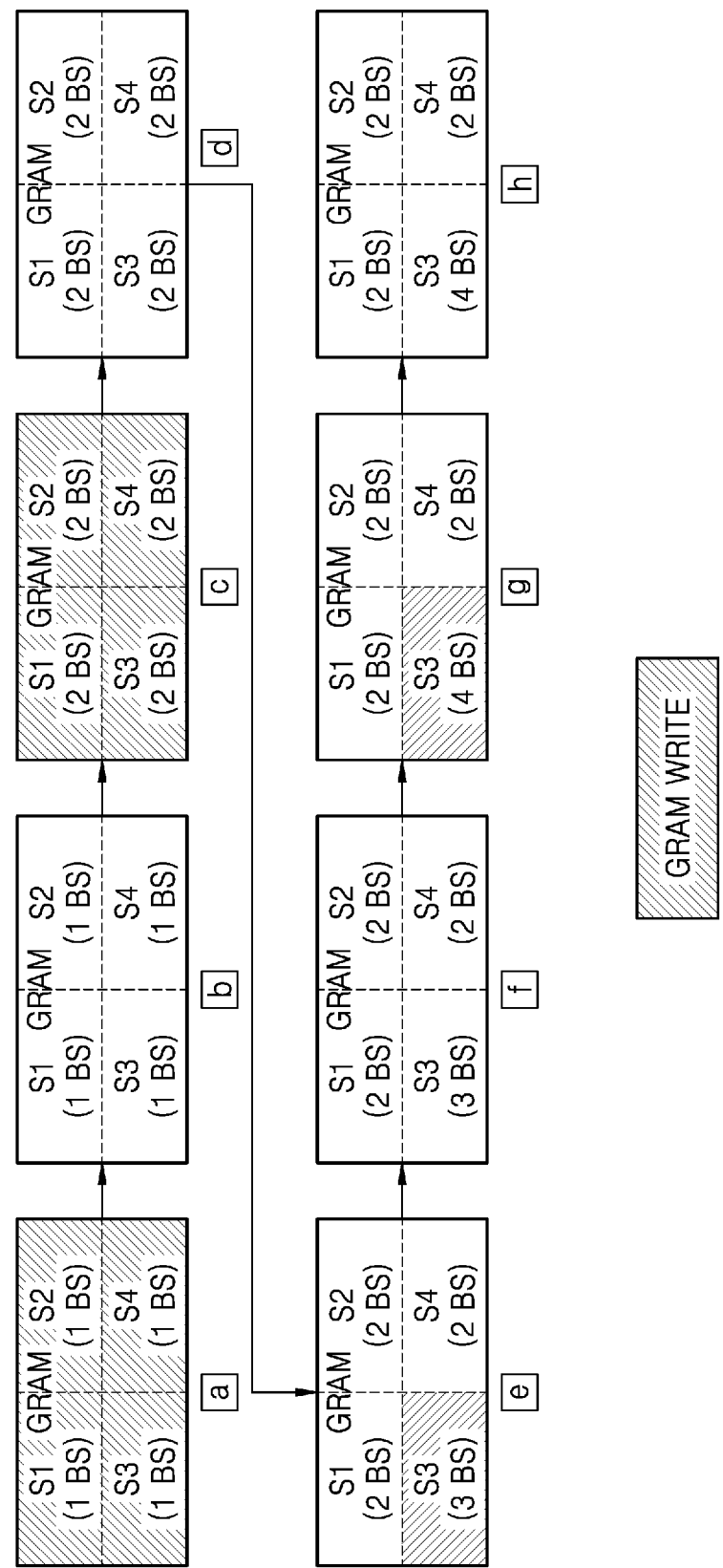
FIG. 6B is a diagram illustrating a storage state of a graphic RAM (GRAM) according to an example embodiment of the present disclosure over time.

FIG. 6B is a diagram illustrating a storage state of GRAM according to an example embodiment of the present disclosure over time.

Referring to FIG. 6B, in the state (a), the first to fourth slices S1 to S4 may be written to the GRAM 240. Specifically, a value written to the GRAM 240 may be a first bit stream 1 BS. The first bit stream 1 BS may include values obtained by externally encoding pixels of the first slice S1 to the fourth slice S4, that is, the entire image. The state (a) may show the storage state of the GRAM 240 corresponding to the start time point of the first frame. In FIG. 6A, the start time point of the first frame corresponds to the rising edge of the FRAME CNT signal.

In the state (b), the GRAM 240 may read the first bit stream 1 BS for the first slice S1 to the fourth slice S4. Because it is not known whether an update slice will be received in subsequent frames, the controller 220 may store the first bit stream 1 BS in the GRAM 240 (as indicated by state (a)) and then read the stored first bit stream 1 BS to perform image-processing. The state (b) may show the storage state of the GRAM 240 corresponding to the start time point of the first frame.

In the state (c), the GRAM 240 may write the second bit stream 2 BS. That is, if there is no update slice, the display driving circuit 200 may generate a second bit stream 2 BS in order to omit repetitive external decoding and image-processing for obtaining the second pixel data 1b BS. The second bit stream 2 BS may be a value obtained by internally encoding the second pixel data 1b BS. The state (c) may show the storage state of the GRAM 240 corresponding to the end time point of the second frame. Also see the notation "2B" on the GRAM WRITE waveform late in time of the second frame section of FIG. 6A.

In the state (d), the controller 220 may read the second bit stream 2 BS stored in the GRAM 240. The display driving circuit 200 reads the second bit stream 2 BS and performs only decoding on the second bit stream 2 BS through the internal decoder 270 such that even without image-processing pipelining, the second pixel data 1b BS, which is a result of decoding the first bit stream 1 BS, may be obtained in the same manner. The state (d) may show the storage state of the GRAM 240 corresponding to the third frame and the fourth frame section operating in the low power mode (marked "FULL PSM" on FIG. 6A).

In the state (e), the controller 220 may write the third bit stream 3 BS of the GRAM 240. The third bit stream 3 BS may be included in the update slice. That is, the processor 100 may transmit to the display driving circuit 200 as an update slice the third bit stream 3 BS obtained by externally encoding pixels of the third slice S3 including pixels that change in successive frames. The display driving circuit 200 may write the third bit stream 3 BS to a storage area corresponding to the third slice S3 among a plurality of storage areas of the GRAM 240. The state (e) may show the storage state of the GRAM 240 corresponding to the start time point of the fifth frame.

In the state (f), the controller 220 may read the second bit stream 2 BS and the third bit stream 3 BS from the GRAM 240. The third bit stream 3 BS may correspond to a value obtained by externally encoding pixels of the update slice. The second bit stream 2 BS may correspond to a value obtained by internally encoding pixels of a still slice. Because the second bit stream 2 BS is an internally encoded value of the previously image-processed second pixel data 1b BS, if only decoding is performed through the internal decoder 270, the second pixel data 1b BS may be restored again. The controller 220 performs external decoding and image-processing pipelining on the third bit stream 3 BS to obtain the second pixel data 3b BS of the standby slice so that changed pixels may be rendered as needed for the entire image. The state (f) may show the storage state of the GRAM 240 corresponding to the start time point of the sixth frame.

In the state (g), the controller 220 may write the fourth bit stream 4 BS to the GRAM 240. The fourth bit stream 4 BS may include values obtained by internally encoding the second pixel data 3b BS obtained by image-processing the pixels of the standby slice. The state (g) may show the storage state of the GRAM 240 corresponding to the end time point of the sixth frame.

In the state (h), the controller 220 may read the second bit stream 2 BS and the fourth bit stream 4 BS from the GRAM 240. Because the pixels of the still slices S1, S2, and S4 include internally encoded values of the image-processed second pixel data 1b BS, if only decoding is performed through the internal decoder 270, the second pixel data 1b BS may be obtained again. Because the fourth bit stream 4 BS includes second pixel data 3b BS in which pixels of the standby slice are image-processed, if only decoding is performed through the internal decoder 270, the second pixel data 3b BS of the standby slice may be obtained again.

The state (h) may show the storage state of the GRAM 240 corresponding to the seventh frame section.

FIG. 6B illustrates new data passes through the external decoder in the first frame in which it is received, and may be re-fetched and passed through the internal decoder in the next frame if it has not been superseded by yet newer data. During the second frame section (FRM CNT 2) see 2 BS emerging from the internal encoder 280 as a version of 1 BS of the first frame section (FRM CNT 1). Similarly, during the sixth frame section, see 4 BS emerging from the internal encoder 280 as a version of 3 BS of the fifth frame section (FRM CNT 5).

Figure 6C:
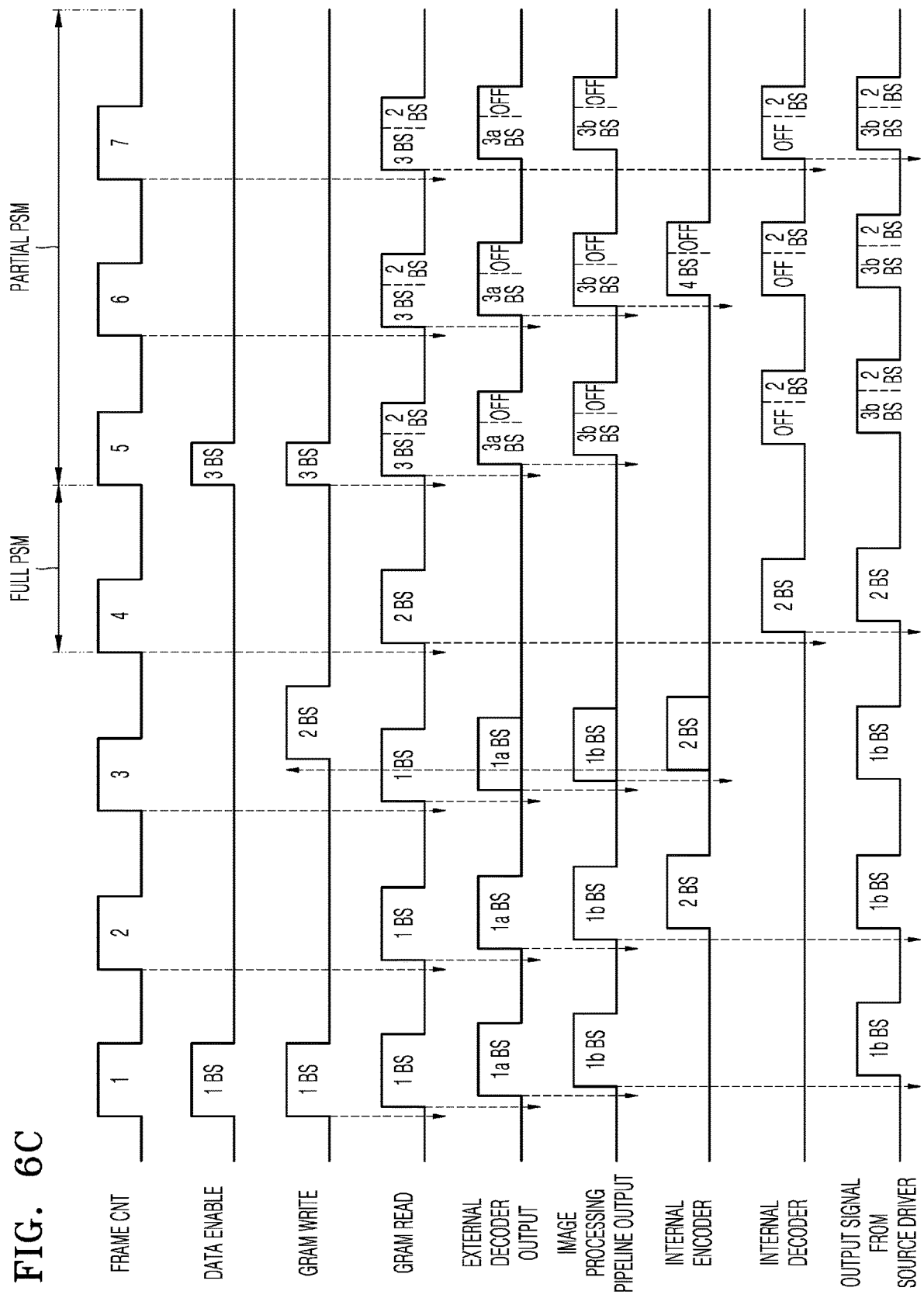
FIG. 6C is a diagram illustrating an operation timing of a display driving circuit based on lossless compression according to an example embodiment of the present disclosure.

FIG. 6C is a diagram illustrating an operation timing of a display driving circuit based on lossless compression according to an example embodiment of the present disclosure. Descriptions of the first frame section, the fourth frame section, and the fifth frame section that are the same as those of FIG. 6A will be omitted.

Referring to FIG. 6C, when performing lossless compression in the second frame section, the controller 220 may determine whether a write operation may be performed on the GRAM 240. Unlike the loss compression shown in FIG. 6A, in relation to the lossless compression, because the size of the compressed image after encoding is not constant according to the size of the input image, that is, the first bit stream 1 BS, it should be determined whether the GRAM 240 may be written. When the controller 220 actually operates, because it is not known when the first frame section starts, that is, at which time point the first bit stream 1 BS will be received, when an output signal 1b BS is generated through the image-processing pipeline 260 using the received first bit stream 1 BS in the first frame section and lossless compression is performed on the first bit stream 1 BS stored in the GRAM 240 in the second frame section, it is determined whether the GRAM 240 may be written. Specifically, after the controller 220 operates in the same manner as the first frame section up to the image-processing pipeline 260, the generated output signal 1b BS is output, and at the same time, the second bit stream 2 BS may be obtained by inputting the output signal 1b BS to the internal encoder 280. The controller 220 may determine whether lossless compression may be performed by comparing the size of the losslessly compressed second bit stream 2 BS with the size of a storage area corresponding to the GRAM 240. In FIG. 6C, the controller 220 will be described based on the determination that lossless compression is possible in the second frame section.

In the third frame section, the controller 220 may generate a second bit stream 2 BS based on lossless compression and store the generated second bit stream 2 BS in the GRAM 240. Specifically, at the start time point of the third frame section, the internally encoded second bit stream 2 BS may not be stored yet in the GRAM 240. Because the second bit stream 2 BS previously generated in the second frame section is for determining whether lossless compression may be performed, it may be in a storage state that is not written to the GRAM 240. Accordingly, the controller 220 may read the first bit stream 1 BS stored in the GRAM 240 again, decode the read first bit stream 1 BS through the external decoder 250, and perform pipelining through the image-processing pipeline 260 to generate an output signal 1b BS. At the same time, the output signal 1b BS is transmitted to the internal encoder 280 to be losslessly compressed. The losslessly compressed bit stream may be a second bit stream 2 BS. The controller 220 may transmit the losslessly compressed second bit stream 2 BS to the GRAM 240 and write the losslessly compressed second bit stream 2 BS to a corresponding storage area. Auxiliary information related to the lossless compression of internal encoder 280 and lossless decompression of internal decoder 270 may be stored in a memory (not shown) either internal or external to the display driver circuit 200. The third frame section begins an interval marked "FULL PSM" on FIG. 6A. "PSM" stands for "power save mode."

In the fourth frame section, because there is no change in the input image frame, the controller 220 outputs the losslessly compressed second bit stream 2 BS from the GRAM 240 and decodes the losslessly compressed second bit stream 2 BS through the internal decoder 270 to immediately restore the output signal 1b BS. The fourth frame section of FIG. 6C may be the same as the third frame section and the fourth frame section of FIG. 6A. That is, the fourth frame section may correspond to a full power save mode (FULL PSM).

During the fifth frame section, the display driving circuit 200 may receive a second update slice. The second update slice may have a third bit stream 3 BS. Unlike the first update slice, the second update slice may include some slices of a plurality of slices constituting an image frame. That is, when only a partial area of the image frame is changed, the second update slice may correspond to a slice including the changed area. For example, referring to FIG. 5 along with FIG. 6C, the n-th frame and the (n−1)-th frame may differ only in the area of the third slice S3. The processor 100 may transmit only the third slice S3 to the display driving circuit 200 as the second update slice.

The controller 220 may write the second update slice to the GRAM 240. Because the second update slice is a slice corresponding to a partial area of the image frame, the controller 220 may write the second update slice to a storage area mapped to a partial area of the image frame among storage areas of the GRAM 240. For example, the controller 220 may write the third slice S3 to a third area of the storage areas of the GRAM 240.

The GRAM 240 may store both the second bit stream 2 BS and the third bit stream 3 BS. That is, the first slice S1, the second slice S2, and the fourth slice S4 may include a second bit stream 2 BS, and the third slice S3 may include a third bit stream 3 BS. According to an embodiment, the GRAM 240 may output read data to the external decoder 250 and the internal decoder 270, respectively. The GRAM 240 may output a third bit stream 3 BS to the external decoder 250 and output a second bit stream 2 BS to the internal decoder 270 in a slice unit. This is because the second bit stream 2 BS is an internally encoded stream through the internal encoder 280, and the third bit stream 3 BS is an externally encoded stream through the external decoder 250.

The external decoder 250 may perform decoding on the third bit stream 3 BS of the third slice S3. Through the decoding, the external decoder 250 may obtain the first pixel data 3a BS of the third slice S3. Because the external decoder 250 received only the third bit stream 3 BS of the third slice S3 from the GRAM 240, the decoding of the remaining slices S1, S2, and S4 having the second bit stream 2 BS may not be performed. Assuming that the time required to decode each slice is the same, it can be seen that the activation time of the external decoder 250 is reduced to ¼ compared to when all slices of the GRAM 240 are decoded. That is, the external decoder 250 may operate in the low power mode reduced by 75% compared to processing all slices of a frame.

The image-processing pipeline 260 may receive the first pixel data 3a BS of the third slice S3 and perform image-processing. The image-processing pipeline 260 may produce image-processed second pixel data 3b BS. The second pixel data 3b BS may correspond to result values obtained from image-processing of pixels of the third slice S3. The image-processing pipeline 260 may output the second pixel data 3b BS of the third slice S3 to the source driver 290.

The internal decoder 270 may operate in parallel with the external decoder 250 and the image-processing pipeline 260. The internal decoder 270 may receive the second bit stream 2 BS from the GRAM 240 and perform decoding on the second bit stream 2 BS. The second bit stream 2 BS may correspond to an internally encoded value by completing the image-processing of the pixels of the first slice S1, the second slice S2, and the fourth slice S4. In the fifth frame section, because the changed pixel value is included in the third slice S3, the remaining slices S1, S2, and S4 may be the same as outputting a still image. Accordingly, the internal decoder 270 decodes the second bit stream 2 BS to obtain the second pixel data 1b BS of the remaining slices S1, S2, and S4 and outputs the obtained second pixel data 1b BS to the source driver 290.

As described above with respect to FIG. 6A, in some embodiments, the source driver 290 may further include a buffer (not shown). Because the second pixel data fetched from the GRAM 240 (already previously operated on by external decoder 25) is processed by the internal decoder 270 more quickly than data such as 3 BS processed by the external decoder 250 and the image-processing pipeline 260, a buffer may be used to align these results in time. For example, the second pixel data 1b BS of the remaining slices S1, S2, and S4 are temporarily stored in a buffer (not shown) and the second pixel data 3b BS of the update slice S3 is then received. The source driver 290 may then associated the second pixel data 1b BS and 3b BS at the same time and output the result to the display panel 300.

In the above-described embodiment, it has been described that the internal decoder 270 may operate in parallel with the external decoder 250 and the image-processing pipeline 260, but is not limited thereto. According to various embodiments, the internal decoder 270 may be activated alternately with the external decoder 250 and the image-processing pipeline 260. For example, the GRAM 240 may sequentially output a plurality of slices according to a slice unit. Because the first slice S1 is a still image, the GRAM 240 may operate to output the first slice S1 to the internal decoder 270, and thereafter, because the second slice S2 is a still image, the GRAM 240 may operate to output the second slice S2 to the internal decoder 270, and thereafter, because the third slice S3 is an update slice, the GRAM 240 may operate to output the third slice S3 to the external decoder 250. When the GRAM 240 sequentially outputs a plurality of slices, the internal encoder 280 and the external encoder 110 are not activated at the same time, and activation/deactivation may be repeated by alternating with each other.

In an example, an update slice may not be received in the sixth frame section, see FIG. 6C at the FRAME CNT waveform marked 6. When it is identified that an update slice is not received in the sixth frame section, and lossless compression is performed in response to the identification, the controller 220 may determine whether a write operation may be performed on the GRAM 240. When the third bit stream 3 BS of the third slice S3 received in the fifth frame section is losslessly compressed, it is assumed that the GRAM 240 is compressed to a size that cannot be written to.

The controller 220 may perform internal encoding of the second pixel data 3b BS image-processed by the image-processing pipeline 260 in the sixth frame section. The controller 220 may activate the internal encoder 280 on the second pixel data 3b BS and receive the image-processed second pixel data 3b BS to perform internal encoding. The controller 220 losslessly compresses the pixel data image-processed by the third slice S3 and obtains a fourth bit stream 4 BS. The controller 220 may determine whether lossless compression is possible by comparing the size of the obtained fourth bit stream 4 BS to the size of a storage area corresponding to the GRAM 240. As described above, the size of the fourth bit stream 4 BS corresponding to the lossless compression result of the third slice S3 is different from the size of the storage area corresponding to the GRAM 240 and cannot be stored. Accordingly, in the sixth frame section, the controller 220 may determine that lossless compression of the third bit stream 3 BS cannot be performed (note that there is no GRAM WRITE activity of 4 BS in the sixth frame section), and bypass performing lossless compression through the internal encoder 280 and the internal decoder 270 in subsequent frames (more than the seventh frame section). Rather, because a lossless compression result cannot be stored in the GRAM 240 at this time, the third bit stream 3 BS is fetched from the GRAM 240 as needed and passed through the external decoder 250, the image processing pipeline 260 and the mux 230-3 to the source driver 290 as needed. This is unlike the events at the sixth frame section in FIG. 6A in which the internal encoder 280 operates on 4 BS and the result is written to the GRAM 240 (GRAM WRITE 4 BS in sixth frame section of FIG. 6A) and read from the GRAM 240 in the seventh frame section (FIG. 6A). That is, the controller 220 repeatedly performs a process of processing the image through the external decoder 250 and the image-processing pipeline 260 for the third bit stream 3 BS (see the GRAM READ waveform) received in the fifth frame section and then outputting the processed image. The internal decoder 270 is activated for the 2 BS data which was compressed and written to the GRAM 240 during the third frame section. The fifth to seventh frame sections may correspond to a partial power save mode based on the "OFF" portions indicated for the external decoder 250, the image processing pipeline 260, the internal encoder 280, and the internal decoder 270 for the fifth to seventh frame sections.

Figure 7:
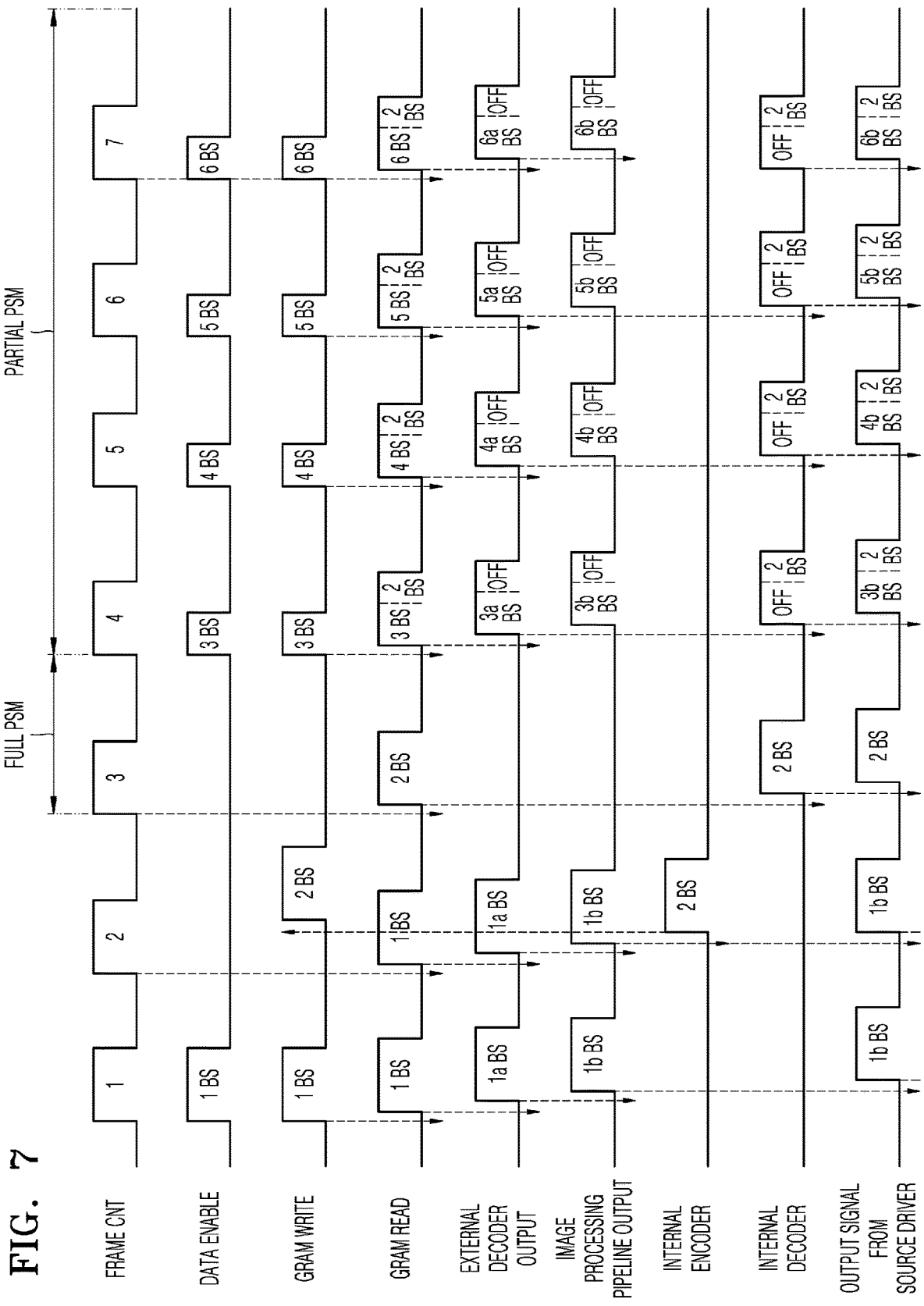
FIG. 7 is a diagram illustrating an operation timing of a display driving circuit according to an example embodiment of the present disclosure.

FIG. 7 is a diagram illustrating an operation timing of a display driving circuit according to an example embodiment of the present disclosure. Descriptions that are the same as those of FIG. 6A will be omitted.

Referring to FIG. 7, the display driving circuit 200 may receive an update slice every frame during the fourth to seventh frame sections.

During the fourth frame section, the display driving circuit 200 may receive a second update slice. The second update slice may have a third bit stream 3 BS. The third bit stream 3 BS may correspond to values obtained by externally encoding pixels included in the second update slice.

The controller 220 may write the third bit stream 3 BS to a storage area corresponding to the second update slice among the storage areas of the GRAM 240. For example, when the second update slice is the first slice S1, the controller 220 may write the third bit stream 3 BS to an area corresponding to the first slice S1 among the storage areas of the GRAM 240.

As described above with reference to FIG. 6A, the internal decoder 270 receives and decodes the internally encoded second bit stream 2 BS from the GRAM 240 to obtain second pixel data 1b BS of still slices. The external decoder 250 may receive the externally encoded third bit stream 3 BS from the GRAM 240 and perform decoding and image-processing through the image-processing pipeline 260 to obtain the second pixel data 3b BS of the second update slice.

During the fifth frame section, the display driving circuit 200 may receive the third update slice. The third update slice may have a fourth bit stream 4 BS. The fourth bit stream 4 BS may correspond to values obtained by externally encoding pixels included in the third update slice.

According to an embodiment, the third update slice and the second update slice may correspond to the same slice. For example, the second update slice and the third update slice may correspond to the first slice S1. That is, a pixel change may occur only in the first slice S1.

The controller 220 may determine an operation mode in a slice unit. For example, when determining the operation mode for the first slice S1, the controller 220 may determine the operation mode based only on the first slice S1. Because the third update slice for the first slice S1 has been received, the controller 220 may write the third update slice to the GRAM 240. That is, because the second update slice is received in the previous frame (the fourth frame), it is also possible to perform internal encoding on the second update slice in the current frame (the fifth frame), but because a new third update slice is received in the current frame (the fifth frame) as 4 BS leading to 4a BS and 4b BS, the third update slice may be stored in the GRAM 240 without performing internal encoding on the second update slice. The controller 220 decodes the second bit stream 2 BS of the still slices S2, S3, and S4 excluding the first slice S1 corresponding to the update slice through the internal decoder 270 to obtain the previously image-processed second pixel data 1b BS. The controller 220 may decode the fourth bit stream 4 BS of the first slice S1 corresponding to the update slice through the external decoder 250 to obtain first pixel data 4a BS and process the image through the image-processing pipeline 260 to obtain the second pixel data 4b BS of the third update slice. Accordingly, even if the first slice S1 is continuously updated during the fourth to seventh frame sections, the display driving circuit 200 may operate in a partial low power mode. FIG. 7 also shows receiving 5 BS during the sixth frame section leading to 5a BS and 5b BS. In addition, FIG. 7 illustrates receiving 6 BS during the seventh frame section leading to 6a BS and 6b BS.

Figure 8:
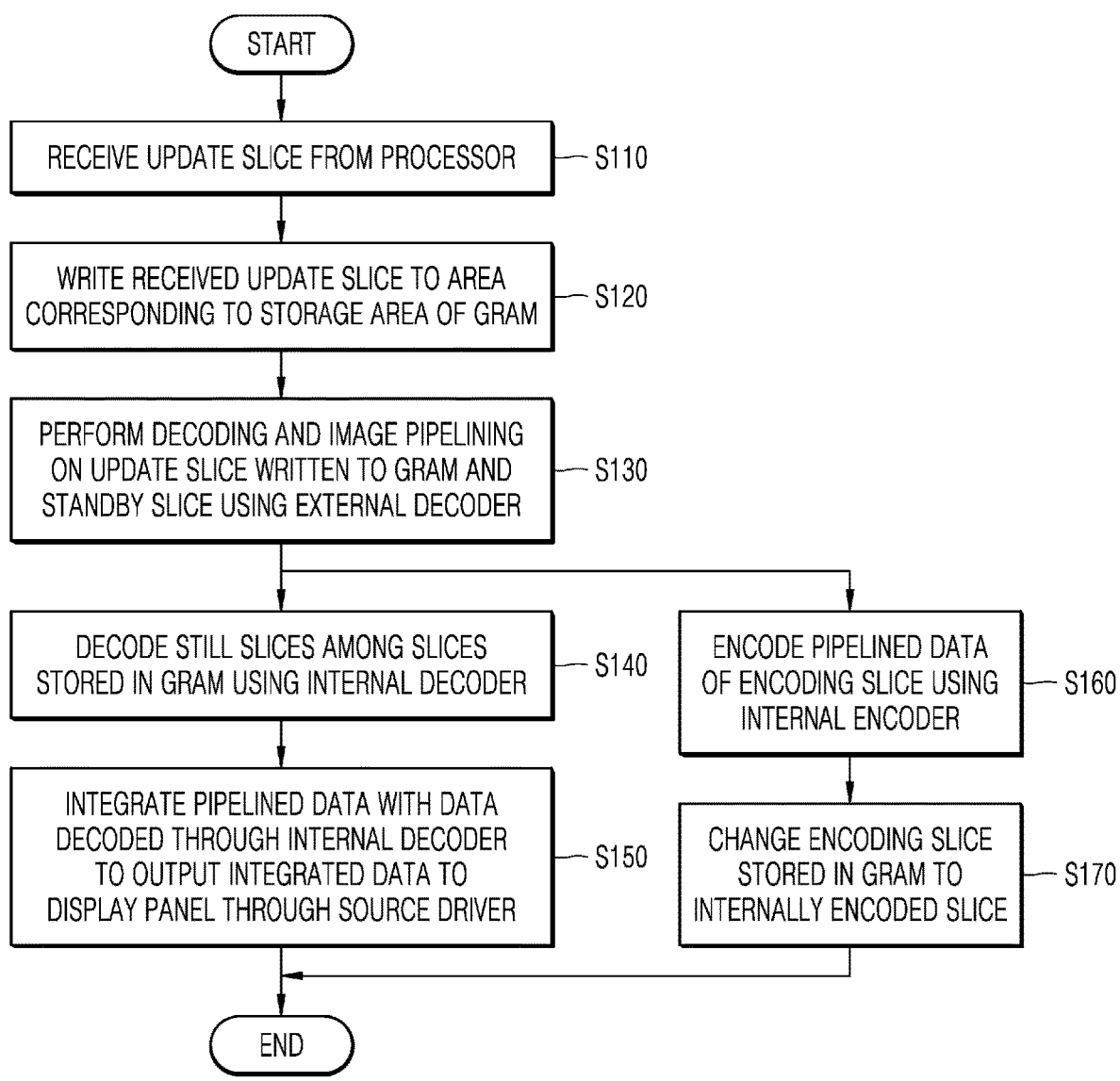
FIG. 8 is a flowchart showing a method of operating a display driving circuit according to an example embodiment of the present disclosure.

FIG. 8 is a flowchart showing a method of operating a display driving circuit according to an example embodiment of the present disclosure.

Referring to FIG. 8, in operation S110, the display driving circuit 200 may receive an update slice from the processor 100. The update slice may refer to a slice including the changed pixel. The update slice may include at least one of slices of the image frame. For example, when the entire screen is switched and the images of the (n−1)-th frame and the n-th frame are different, the update slice may include all slices of the image frame. As another example, referring to FIG. 5 together, pixels may be changed only in the third slice S3 as the pendulum moves. In this case, the update slice may include only the third slice S3.

In operation S120, the display driving circuit 200 may write the received update slice to a corresponding area among the storage areas of the GRAM 240. For example, if the update slice includes only the third slice S3, an area to which the update slice is written may be a storage area mapped to the third slice S3 among storage areas of the GRAM 240.

In operation S130, the display driving circuit 200 may decode the update slice and the standby slice written to the GRAM 240 using the external decoder 250 and perform image pipelining. At a time point at which writing of the update slice is completed, the GRAM 240 may correspond to a state in which the update slice, the standby slice, and the still slice are stored. The standby slice may refer to a slice updated in a previous frame among slices previously stored in the GRAM 240. The still slice may refer to a slice that has not been updated in a previous frame and a current frame among slices stored in the GRAM 240.

The standby slice is a slice that is changed to an update slice in a previous frame, but is not yet internally encoded using the internal encoder 280. Accordingly, the display driving circuit 200 may control the external decoder 250 so that the external decoder 250 reads the update slice and the standby slice. The external decoder 250 may obtain first pixel data before image-processing by decoding the update slice and the standby slice. The image-processing pipeline 260 may convert the first pixel data into second pixel data by performing image pipelining.

In operation S140, the display driving circuit 200 may decode a still slice among slices stored in the GRAM 240 using the internal decoder 270. The still slice may be a slice in which pipelined second pixel data is internally encoded through the internal encoder 280. Accordingly, the display driving circuit 200 may immediately acquire the second pixel data on which the image pipelining has been completed by decoding the still slice through the internal decoder 270.

In operation S150, the display driving circuit 200 may integrate pipe-lined data and data decoded through the internal decoder 270 and output the integrated data to the display panel 300 through the source driver 290. The pipelined data may correspond to second pixel data for the update slice and the standby slice acquired in operation S130. The data decoded through the internal decoder 270 may correspond to second pixel data for a still slice. According to various embodiments, the source driver 290 may further include a buffer (not shown), and using the buffer, the second pixel data for the still slice and the second pixel data for the update slice and the standby slice may be sequentially integrated according to a slice order.

In operation S160, the display driving circuit 200 may encode the pipe-lined data of the standby slice using the internal encoder 280. That is, operation S160 and operations S140 to S150 may be performed in parallel or alternately. The controller 220 may internally encode the second pixel data for the standby slice by applying a control signal according to the second operation mode in Table 1 above.

In operation S170, the display driving circuit 200 may change the standby slice stored in the GRAM 240 into a still slice. That is, the display driving circuit 200 internally encodes the second pixel data for the standby slice and writes the encoded data to the GRAM 240, so that if the standby slice is still not updated in the next frame, it is possible to operate in a low power mode by decoding an internally encoded still slice.

Figure 9:
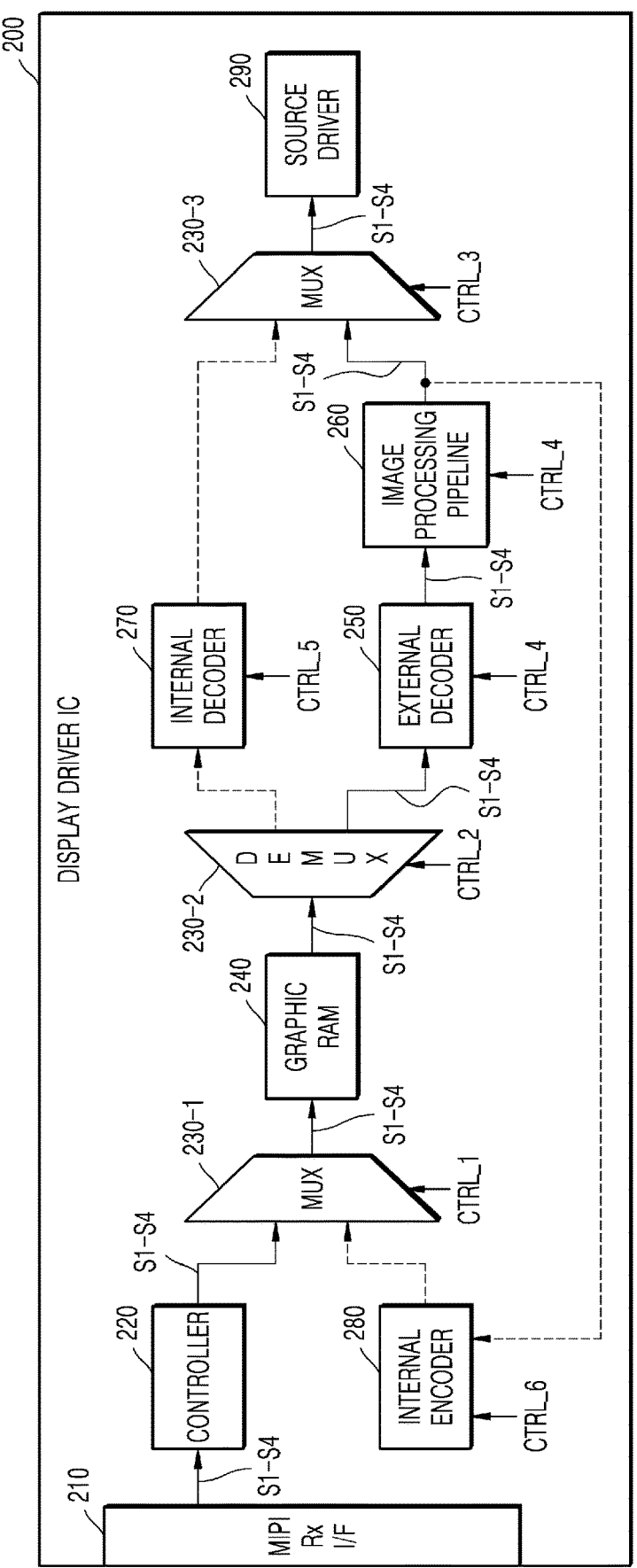
FIG. 9 illustrates a data path according to an example embodiment of the present disclosure.

FIG. 9 illustrates a data path according to an example embodiment of the present disclosure. Specifically, FIG. 9 shows a data path through which an update slice is processed. Hereinafter, the image frame will be described on the basis of including the first slice S1 to the fourth slice S4.

Referring to FIG. 9, the controller 220 may receive an update slice from the transmission/reception interface circuit 210. That is, the update slice may include all of the first to fourth slices S1 to S4. The controller 220 may apply a control signal according to the first mode. That is, by applying a control signal CTRL_1 of "0" to the first MUX 230-1, the first to fourth slices S1 to S4 received by the controller 220 may be written to the GRAM 240. The DEMUX 230-2 may transmit the first slice S1 to the fourth slice S4 read from the GRAM 240 to the external decoder 250 according to the control signal CTRL_2 of "1". The external decoder 250 and the image-processing pipeline 260 may be activated according to the control signal CTRL_4 of "1". Accordingly, the first to fourth slices S1 to S4 are decoded by the external decoder 250 to output first pixel data, and the image-processing pipeline 260 may image-process the first pixel data to output second pixel data. The second MUX 230-3 may output the first slice S1 to the fourth slice S4 output from the image-processing pipeline 260 to the source driver 290 according to the control signal CTRL_3 of "1".

In FIG. 9, a pathway from the image processing pipeline 260 to the internal encoder 280 is not active for any of the slides S1 to S4, and so this pathway has been shown as a dashed line. Similarly the pathways in and out of the internal decoder 270.

Figure 10:
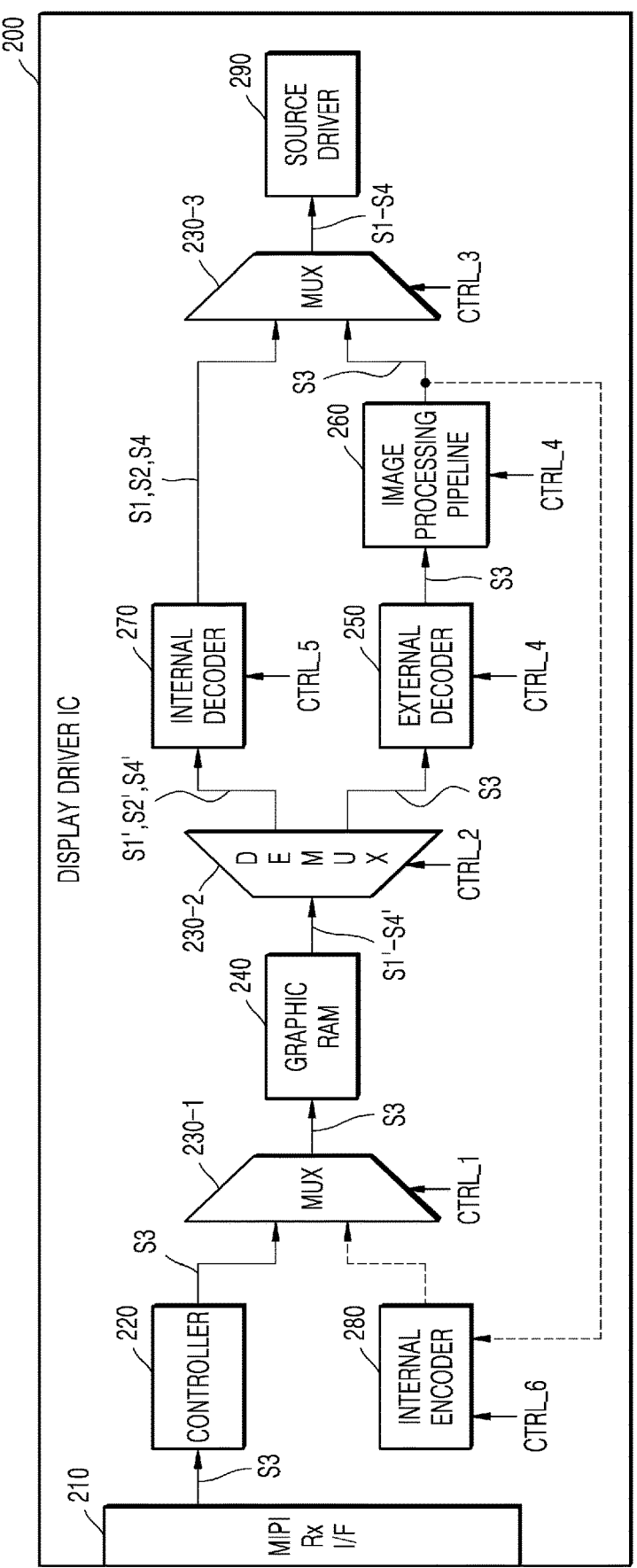
FIG. 10 illustrates a data path according to an example embodiment of the present disclosure.

FIG. 10 illustrates a data path according to an example embodiment of the present disclosure. Specifically, FIG. 10 shows a data path through which an update slice and a still slice are processed.

Referring to FIG. 10, the controller 220 may receive an update slice. The received update slice may correspond to the third slice S3. The controller 220 may write the third slice S3 to the GRAM 240 through the first MUX 230-1. Since the controller 220 may determine an operation mode in a slice unit, operation modes of the third slice S3 and the remaining slices S1, S2, S4 among all slices may be different from each other.

According to an embodiment, the remaining slices stored in the GRAM 240 may be internally encoded slices (or still slices). While processing the remaining slices S1, S2, and S4, the controller 220 may apply a control signal according to the third mode. That is, since the remaining slices S1, S2, S4 have already been encoded through the internal encoder 280, they may be decoded by the internal decoder 270 and output to the source driver 290 through the second MUX 230-3. In contrast to FIG. 9, the pathways in and out of internal decoder 270 are shown with a solid line.

According to an embodiment, because the third slice S3 is an update slice, the controller 220 may apply a control signal according to the first mode. That is, since the third slice S3 includes externally encoded data, the display driving circuit 200 may be controlled for image-pipelining through the internal decoder 270 and the image-processing pipeline 260.

Figure 11:
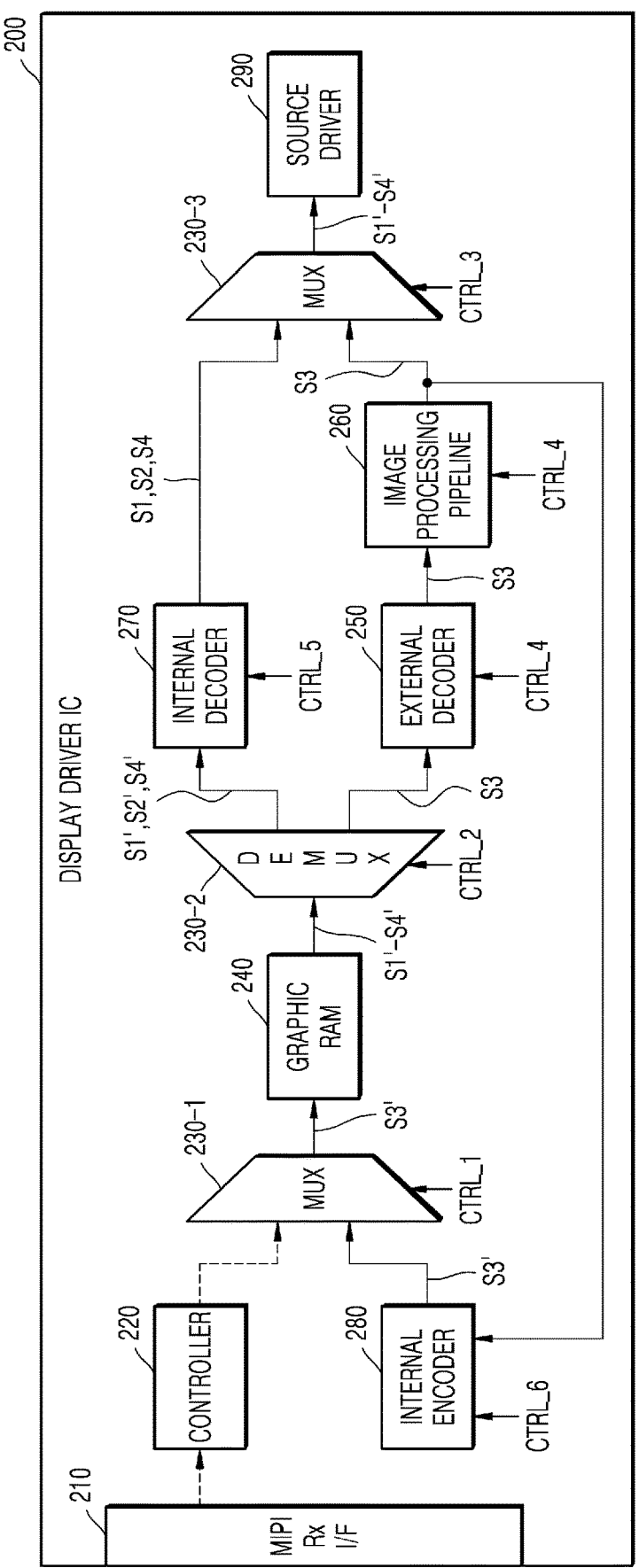
FIG. 11 illustrates a data path according to an example embodiment of the present disclosure.

FIG. 11 illustrates a data path according to an example embodiment of the present disclosure. Specifically, FIG. 11 may show a data path through which a standby slice and a still slice are processed.

Referring to FIG. 11, the controller 220 may not receive a slice. That is, since there is no change in the image frame of the previous frame and the current frame, the processor 100 may not transmit the update slice. The pathways in and out of controller 220 are shown with a dashed line, to indicate that the controller 220 has not received a slice, in the example of FIG. 11.

According to an embodiment, the GRAM 240 may store still slices and standby slices. For example, when the third slice S3 is received as an update slice in the previous frame, the third slice S3 may not be yet internally encoded and may correspond to a standby slice.

The GRAM 240 may output a first slice to a fourth slice S4 in a slice unit. However, because the third slice S3 is a standby slice including externally encoded data, a control signal may be applied according to the second mode to be output to the external decoder 250. The controller 220 may control to apply the control signal CTRL_2 of "1" to the DEMUX 230-2 to be output to the external decoder 250, and apply the control signal CTRL_3 of "1" to the second MUX 230-3 to output the pipe-lined data to the source driver 290. In this case, the controller 220 may encode the second pixel data output from the image-processing pipeline 260 by applying a control signal CTRL_6 of "1" to the internal encoder 280. Thereafter, the first MUX 230-1 transmits the third slice S3' output from the internal encoder 280 to the GRAM 240 according to the control signal CTRL_1 of "1" to write the third slice S3' to the storage area of the third slice S3.

Figure 12:
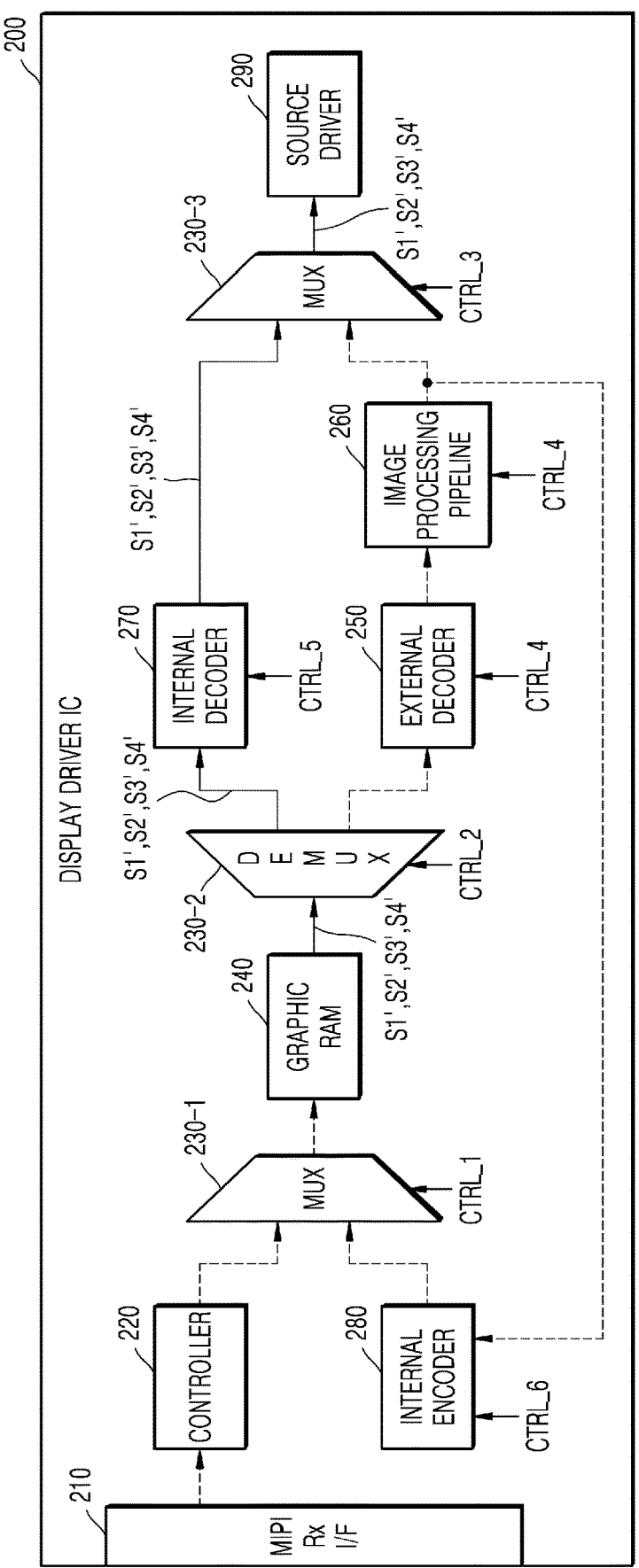
FIG. 12 illustrates a data path according to an example embodiment of the present disclosure.

FIG. 12 illustrates a data path according to an example embodiment of the present disclosure. Specifically, FIG. 12 shows a data path through which still slices are processed.

Referring to FIG. 12, the controller 220 may not receive an update slice. Also, all slices stored in the GRAM 240 may correspond to still slices. For example, if there is no update slice in the previous frame, all slices stored in the GRAM 240 may include internally encoded data. Since all slices stored in the GRAM 240 are still slices, the controller 220 may apply a control signal to the display driving circuit 200 according to the third mode. That is, the controller 220 may sequentially output still slices stored in the GRAM 240 to the internal decoder 270 by applying a control signal CTRL_2 of "0" to the DEMUX 230-2. The internal decoder 270 may decode the internally encoded still slices S1', S2', S3', and S4', and obtain image pipelined pixel data without activating the image-processing pipeline 260. In FIG. 12, the external decoder 250 is not active for the sample of FIG. 12 (no update slice). The pathways in and out of external decoder 250 are thus shown as dashed lines. The data flow is from GRAM 240 through internal decoder 270 to the source driver 290 (see solid lines for pathways).

Figure 13:
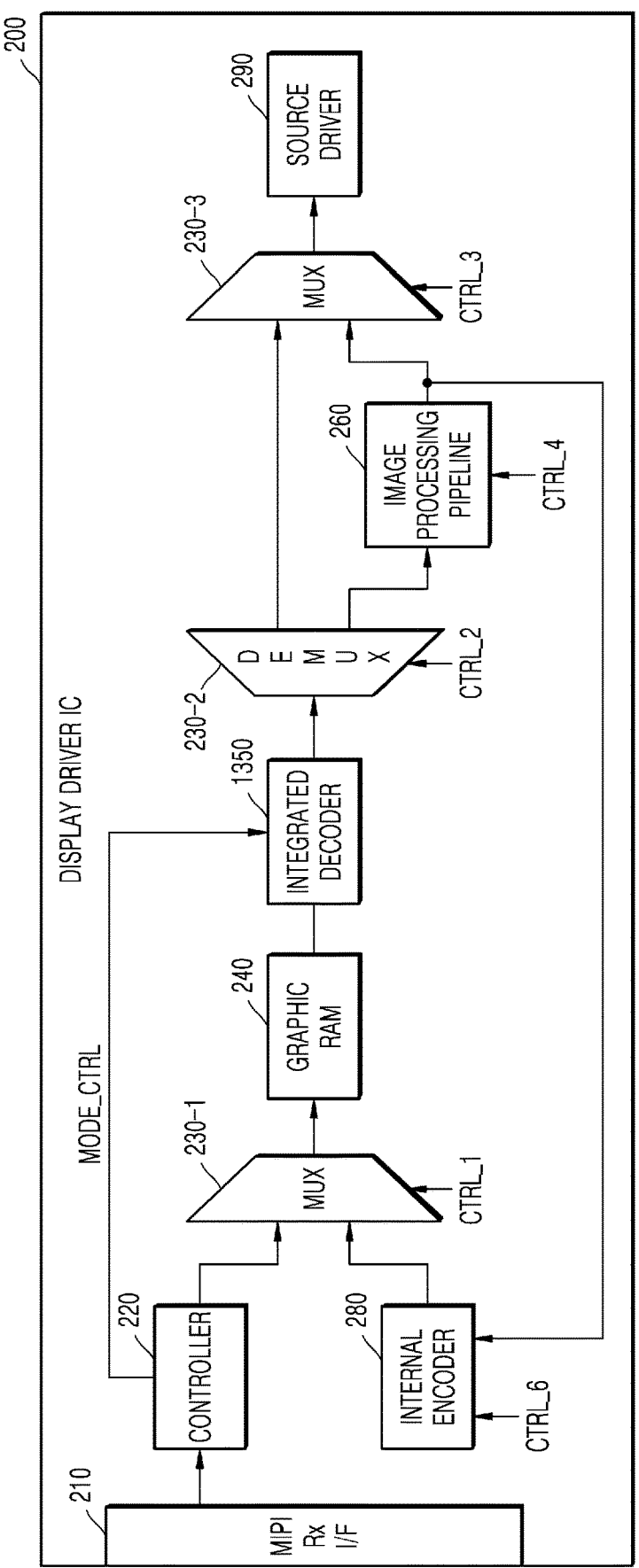
FIG. 13 is a block diagram showing a display driving circuit including an integrated decoder according to an example embodiment of the present disclosure.

FIG. 13 is a block diagram showing a display driving circuit according to an example embodiment of the present disclosure. Descriptions that are the same as those of FIG. 3 will be omitted.

Referring to FIG. 13, the display driving circuit 200 may further include an integrated decoder 1350. The integrated decoder 1350 may refer to a decoder in which the internal decoder 270 and the external decoder 250 of FIG. 3 are integrated into one. The integrated decoder 1350 may receive the mode control signal MODE_CTRL from the controller 220 and variably change the decoding mode based on the mode control signal MODE_CTRL. The decoding mode may include an external decoding mode for decoding the update slice encoded by the processor 100 or an internal decoding mode for decoding a still slice that encodes image-processed data through the image pipeline 260 because the update slice is not received from the processor 100.

According to various embodiments, when the display driving circuit 200 includes the integrated decoder 1350, the controller 220 may transmit a mode control signal MODE_CTRL indicating a mode to the integrated decoder 1350. For example, the controller 220 may transmit to the integrated decoder 1350 the information indicating areas that store externally encoded update slices and areas that store still slices image-processed and internally encoded through the image pipeline 260 among the plurality of storage areas of the GRAM 240 every frame. Accordingly, the integrated decoder 1350 determines whether it is an externally encoded slice or an internally encoded slice each time a plurality of storage areas of the GRAM 240 are sequentially processed to perform decoding in a matching decoding method.

According to various embodiments, the controller 220 may further include information indicating an external decoding mode and an internal decoding mode in the mode control signal MODE_CTRL and transmit the information to the integrated decoder 1350. The external decoding mode and the internal decoding mode may include a plurality of sampling methods. For example, the external decoding mode and the internal decoding mode may be based on at least one of red, green, blue (RGB) sampling, red, green, blue, green (RGBG) sampling, cyan, magenta, yellow, black (CMYK) sampling, hue, intensity, saturation (HIS) sampling, YUV sampling, YCbCr sampling, and YPbPr sampling. According to various embodiments, the external decoding mode and the internal decoding mode may be based on the same sampling or different sampling techniques. That is, the integrated decoder 1350 may receive the mode control signal MODE_CTRL from the controller 220 and perform variable decoding in a slice unit.

According to various embodiments, the controller 220 may control the control signals CTRL_2 and CTRL_3 of the DEMUX 230-2 and the second MUX 230-3 according to the mode control signal MODE_CTRL of the integrated decoder 1350. For example, when the mode control signal MODE_CTRL indicates an external decoding mode, since image-processing through the image-processing pipeline 260 is required, the output of the DEMUX 230-2 may be controlled to be output to the image-processing pipeline 260. The second MUX 230-3 may be controlled to receive the image-processed bit stream through the image-processing pipeline 260. As another example, when the mode control signal MODE_CTRL indicates an internal decoding mode, the control signals CTRL_2 and CTRL_3 may control the DEMUX 230-2 and the second MUX 230-3 so that the output signal of the DEMUX 230-2 is output to the second MUX 230-3 instead of the image-processing pipeline 260.

While embodiments have been shown and described with reference to the respective figures, it will be understood that various changes in form and details may be made therein without departing from the spirit and scope of the following claims.

What is claimed is:

1. A method of operating a display driving circuit, the method comprising:
   receiving an update slice;
   writing the update slice to at least a portion of a graphic memory;
   decoding the update slice to obtain first decoded data and image-processing the first decoded data to obtain image-processed data;
   decoding at least one still slice among a plurality of slices stored in the graphic memory to obtain second decoded data; and
   integrating the second decoded data and the image-processed data.

2. The method of claim 1, wherein the at least one still slice corresponds to a slice that has not been updated during at least two frames.

3. The method of claim 1, wherein the decoding of the update slice is different from the decoding of the at least one still slice, and the decoding of the update slice and the decoding of the at least one still slice are activated alternately.

4. The method of claim 1, wherein the integrating of the second decoded data and the image-processed data further comprises rearranging the second decoded data and the image-processed data according to a slice order.

5. The method of claim 1, wherein the update slice corresponds to a first slice including at least one pixel that is changed between a previous frame and a current frame.

6. A display driving circuit comprising:
a graphic memory configured to store a plurality of slices including an update slice and a still slice;
a first decoder configured to obtain first decoded data by decoding the update slice stored in the graphic memory;
a second decoder configured to obtain second decoded data by decoding the still slice stored in the graphic memory;
an image-processing pipeline configured to process the first decoded data to obtain image-processed data;
a source drive configured to integrate the image-processed data from the image-processing pipeline and the second decoded data to obtain integrated data.

7. The display driving circuit of claim 6, further comprising:
an encoder configured to generate the still slice; and
a controller configured to receive the update slice, and write the update slice to at least a portion of the graphic memory.

8. The display driving circuit of claim 6, wherein the still slice corresponds to a slice that has not been updated during at least two frames.

9. The display driving circuit of claim 7, wherein the first decoder uses a first decoding method that is different from a second decoding method of the second decoder, and
wherein the controller is further configured to alternately activate the first decoder and the second decoder.

10. The display driving circuit of claim 7, wherein the controller further comprises a slice type analysis circuit and a control signal generation circuit,
wherein the slice type analysis circuit is configured to:
identify a first slice updated in a current frame among slices of the graphic memory as the update slice, and
identify remaining slices excluding the update slice among the plurality of slices of the graphic memory as the still slice.

11. The display driving circuit of claim 6, further comprising a source driver configured to output the integrated data to a display panel,
wherein the source driver is further configured to rearrange the second decoded data and the image-processed data according to a slice order by using a buffer to output the integrated data.

12. The display driving circuit of claim 10, further comprising:
a first switching circuit configured to transmit a first output of one of the controller and a second encoder to the graphic memory;
a second switching circuit configured to transmit a second output from the graphic memory to one of the second decoder and the first decoder; and
a third switching circuit configured to transmit a third output of one of the second decoder and an image processing pipeline to a source driver.

13. The display driving circuit of claim 12, wherein the control signal generation circuit is configured to:
generate a first mode signal in response to the update slice,
generate a second mode signal in response to the still slice.

14. The display driving circuit of claim 13, wherein the first mode signal comprises first control signals for connecting a first input of the first switching circuit to the controller, connecting the second output of the second switching circuit to the first decoder, and connecting a third input of the third switching circuit to the image processing pipeline, and
the second mode signal comprises second control signals for connecting the second output of the second switching circuit to the second decoder, activating the second decoder, and connecting the third input of the third switching circuit to the second decoder.

15. A display driving circuit comprising:
a graphic memory configured to store a plurality of slices including an update slice and a still slice;
a decoder configured to obtain first decoded data from the update slice stored in the graphic memory, and a second decoded data from the still slice stored in the graphic memory;
an image-processing pipeline configured to process the first decoded data from the decoder to obtain image-processed data;
a source driver configured to integrate the second decoded data from the decoder and the image-processed data.

16. The display driving circuit of claim 15, further comprising:
an encoder configured to generate the still slice; and
a controller configured to receive the update slice, and write the update slice to at least a portion of the graphic memory,
wherein the still slice corresponds to a slice that has not been updated during at least two frames.

17. The display driving circuit of claim 15, wherein the source driver is further configured to:
rearrange the second decoded data and the image-processed data according to a slice order by using a buffer, and
output an integrated data to a display panel.

18. The display driving circuit of claim 16, further comprising:
a first switching circuit configured to transmit, to the graphic memory, a first output which is from one of the controller and the encoder;
a second switching circuit configured to transmit, a second output of the decoder, to one of an image processing pipeline or a third switching circuit; and
the third switching circuit configured to transmit, to the source driver, a third output which is from one of the image processing pipeline or the second switching circuit.

19. The display driving circuit of claim 18, wherein the decoder is configured to receive a first mode signal in response to the update slice, and receive a second mode signal in response to the still slice.

20. The display driving circuit of claim 19, wherein the first mode signal comprises first control signals for connecting a first input of the first switching circuit to the controller, connecting a second input of the second switching circuit to the image processing pipeline, and for connecting a third input of the third switching circuit to the image processing pipeline,
wherein the second mode signal comprises second control signals for connecting the first input of the first switching circuit to the encoder, connecting the second input of the second switching circuit to the third switching circuit, and for connecting the third input of the third switching circuit to the second switching circuit.

\* \* \* \* \*